US012710264B2

(12) United States Patent
Sagberg et al.

(10) Patent No.: US 12,710,264 B2
(45) **Date of Patent: *Aug. 18, 2026**

(54) OPTICAL DISPLACEMENT SENSOR

(71) Applicant: SensiBel AS, Oslo (NO)

(72) Inventors: Håkon Sagberg, Oslo (NO); Matthieu Lacolle, Nesøya (NO)

(73) Assignee: SensiBel AS, Oslo (NO)

( * ) Notice: Subject to any disclaimer, the term of this patent is extended or adjusted under 35 U.S.C. 154(b) by 43 days.

This patent is subject to a terminal disclaimer.

(21) Appl. No.: 18/894,557

(22) Filed: Sep. 24, 2024

(65) Prior Publication Data

US 2025/0012561 A1 Jan. 9, 2025

Related U.S. Application Data

(63) Continuation of application No. 18/267,314, filed as application No. PCT/GB2021/053291 on Dec. 14, 2021, now Pat. No. 12,385,735.

(30) Foreign Application Priority Data

Dec. 14, 2020 (GB) ..................................... 2019714

(51) Int. Cl.
*G01B 11/14* (2006.01)
*G01D 5/38* (2006.01)
(Continued)

(52) U.S. Cl.
CPC ............... *G01B 11/14* (2013.01); *G01D 5/38* (2013.01); *H04R 23/008* (2013.01); *H04R 29/004* (2013.01)

(58) Field of Classification Search
CPC ........................... H04R 23/008; H04R 29/004; G01B 9/02097; G01B 2290/30; G01B 11/026;
(Continued)

(56) References Cited

U.S. PATENT DOCUMENTS 10,670,622 B2 * 6/2020 Johansen .............. G01P 15/093
11,240,607 B2 * 2/2022 Angelskår .......... G01B 9/02051
(Continued)

FOREIGN PATENT DOCUMENTS

CN 102540304 A 7/2012
CN 110446580 A 11/2019
(Continued)

OTHER PUBLICATIONS

Search Report, EP Application No. 24207020.9, dated Jun. 13, 2025.

(Continued)

*Primary Examiner* — Gordon J Stock, Jr.
(74) *Attorney, Agent, or Firm* — MARSHALL, GERSTEIN & BORUN LLP

(57) ABSTRACT

An optical displacement sensor comprises a reflective surface and one or more diffraction gratings which, together with the reflective surface, each define a respective interferometric arrangement. The reflective surface is moveable relative to the diffraction grating(s) or vice versa. Light from a light source propagates via the interferometric arrangement(s) to produce an interference pattern at a respective set of photo detectors. Each interference pattern depends on the separation between the reflective surface and the respective grating. A collimating optical arrangement at least partially collimates the light between the light source and the diffraction grating(s). For the or each interferometric arrangement, when the reflective surface or the diffraction grating is in a zero-displacement position, the optical path length L of the light propagating between the diffraction grating and the reflective surface satisfies the relationship:
(Continued)

$$L = \frac{T_z n}{2},$$

to within 20% of $$\frac{T_z}{2},$$

where n is an integer; where $T_z$ is the Talbot length, defined by:

$$T_z = \frac{\lambda}{1 - \sqrt{1 - \frac{\lambda^2}{p^2}}},$$

where λ is the wavelength of the light, and where p is the grating period of the respective diffraction grating.

20 Claims, 9 Drawing Sheets

(51) Int. Cl.
*H04R 23/00* (2006.01)
*H04R 29/00* (2006.01)

(58) Field of Classification Search
CPC ....... G01B 11/14; G01B 11/16; G01B 11/161; G01B 11/165; G01B 11/167; G01B 11/24; G01B 11/2441; G01B 11/25; G01B 11/254; G01D 5/34715; G01D 5/34707; G01D 5/347; G01D 5/34; G01D 5/32; G01D 5/30; G01D 5/285; G01D 5/266; G01D 5/38; G01D 5/36; G01D 5/28
See application file for complete search history.

(56) References Cited

U.S. PATENT DOCUMENTS

| | | | | |
|---|---|---|---|---|
| 12,069,432 | B2 * | 8/2024 | Sagberg | H04R 23/008 |
| 12,328,548 | B2 * | 6/2025 | Sagberg | G01B 11/14 |
| 12,385,735 | B2 * | 8/2025 | Sagberg | G01D 5/38 |
| 2002/0039463 | A1 | 4/2002 | Degertekin et al. | |
| 2004/0130728 | A1 | 7/2004 | Degertekin et al. | |
| 2006/0227845 | A1 | 10/2006 | Degertekin et al. | |
| 2016/0138906 | A1 * | 5/2016 | Lacolle | G01B 11/14 356/614 |
| 2016/0219374 | A1 | 7/2016 | Hall et al. | |

FOREIGN PATENT DOCUMENTS

| | | | | |
|---|---|---|---|---|
| EP | 3628990 | A1 | 4/2020 | |
| GB | 2589415 | A | 6/2021 | |
| WO | WO-03/043377 | A1 | 5/2003 | |
| WO | WO-2014/202753 | A1 | 12/2014 | |
| WO | WO-2019/220103 | A1 | 11/2019 | |
| WO | WO-2021219994 | A1 * | 11/2021 | H04R 1/08 |

OTHER PUBLICATIONS

Office Action, Japanese Application No. 2023-535812, dated Nov. 11, 2025.
International Search Report and Written Opinion, International Application No. PCT/GB2021/053291, mailed Jul. 8, 2022.
Hall et al., “Micromachined optical microphone structures with low thermal-mechanical noise levels”, The Journal of the Acoustical Society of America, vol. 122, No. 4, Jan. 1, 2007.
Search Report, GB Application No. 2019714.1, dated Jun. 11, 2021.
Search Report, GB Application No. 2019714.1, dated Nov. 29, 2021.
Office Action, Chinese Application No. 202180083878.4, dated Mar. 25, 2026.

* cited by examiner

Relative Diffraction Efficiency
100%
50%
0%
28
26
0
λ/4
λ/2
Distance Between Grating and Membrane
30
32
Low Sensitivity
Operation Range 88a
88b
88c
102
$r_D$
$w_D$
$d_D$
$r_S$
$w_S$
$w_G$
$r_G$
$R_D$
100
80
102
102
102
103
$r_B$
$w_B$
82
86

70
72
74
76
78
88b
98
96
86
80
$\theta_B$
$2\theta_L$
94
82
92
90
84

114
118
118
116
116
112
130
130
128
128
122
132
132
126
126
120
124
124

136
138
138
134
150
142
148
148
146
146
140
144
144

154
156
156
152
170
170
168
160
166
164
158
162
162

174
176
176
172
188
186
186
184
184
180
178
182
182

OPTICAL DISPLACEMENT SENSOR

CROSS REFERENCE TO RELATED APPLICATIONS

This application is a Continuation Application of U.S. patent application Ser. No. 18/267,314, filed on Jun. 14, 2023, the entirety of which is herein expressly incorporated by reference.

FIELD OF THE DISCLOSURE

This invention relates generally to optical displacement sensors and in particular, but not exclusively, to optical displacement sensors for use in optical microphones.

BACKGROUND

Microphones are used to convert sound waves into electrical signals, typically by measuring the displacement of a moveable member (e.g. a membrane) that vibrates in response to ambient acoustic vibrations. There are a number of ways of measuring the displacement of such a moveable member, including capacitive readout (commonly called condenser microphones) and electrostatic or electromagnetic readout mechanisms (e.g. dynamic microphones).

An alternative way of reading out the position of a microphone membrane is to use an optical displacement sensor that uses optical interferometric read out. In typical examples of such systems, a diffraction grating is provided on a substrate adjacent to a membrane, and light is directed onto the diffraction grating. A first portion of the light is reflected back from the grating. A second portion is transmitted through the grating, which diffracts the radiation. The diffracted radiation impinges on the membrane, which reflects it onto the grating. The radiation passes through the grating and the two portions of light interfere to create an interference pattern that can be detected by a detector. The interference pattern has a shape (i.e. spatial distribution) matching the diffraction orders of the grating, but the light intensity directed into these diffraction orders depends on the relative phase of the two portions of light, and therefore on the distance between the grating and the membrane. The position (and therefore the movement) of the membrane can thus be determined from changes in the intensity of the light at the detector.

Such optical displacement sensors have a high signal to noise ratio (SNR) and high sensitivity, which is beneficial for use in optical microphones and other applications. However, further improvements in the performance of such optical displacement sensors are desirable.

SUMMARY

When viewed from a first aspect, the invention provides an optical displacement sensor comprising:

a reflective surface;

one or more diffraction gratings spaced from the reflective surface, wherein the or each diffraction grating together with the reflective surface defines a respective interferometric arrangement, and wherein either i) the reflective surface or ii) the or each diffraction grating is moveable relative to the other;

a light source arranged to provide light to said interferometric arrangement(s) such that, for each interferometric arrangement, a first portion of said light propagates along a first optical path via the interferometric arrangement and a second portion of said light propagates along a second, different optical path via said interferometric arrangement, thereby giving rise to an optical path difference between the first and second optical paths which depends on a separation between the reflective surface and the diffraction grating of the interferometric arrangement; and for each interferometric arrangement, a respective set of one or more photo detector(s) arranged to detect at least part of an interference pattern generated by said first and second portions of light dependent on said optical path difference;

a collimating optical arrangement arranged to at least partially collimate the light between the light source and the diffraction grating(s);

wherein, for the or each interferometric arrangement, when the reflective surface or the diffraction grating is in a zero-displacement position, the diffraction grating is spaced from the reflective surface by a distance such that the respective first portion of light travels along an optical path length L between the diffraction grating and the reflective surface;

wherein the or each diffraction grating comprises a periodic diffraction grating with a grating period p such that for the or each interferometric arrangement, the grating period p and the optical path length L satisfy the relationship:

$$L = \frac{T_z n}{2}, \quad \text{[Equation 1]}$$

to within 20% of $$\frac{T_z}{2},$$

where n is an integer;

where $T_z$ is the Talbot length, defined by:

$$T_z = \frac{\lambda}{1 - \sqrt{1 - \frac{\lambda^2}{p^2}}}, \quad \text{[Equation 2]}$$

where λ is the wavelength of the light.

The Applicant has appreciated that in optical displacement sensors utilising diffraction gratings, a significant amount of light may be lost due to diffraction, impairing the performance of the optical displacement sensor (e.g. reducing the sensitivity). While the diffraction grating allows the separation of the light into separate channels corresponding to different diffraction orders to produce a signal (e.g. a differential signal) corresponding to the separation between the reflective surface and the diffraction grating, typically some light is diffracted in directions such that it is not ultimately collected by the photo detector(s), e.g. it may be lost due to multiple reflections and absorption in the air gap between the diffraction grating and the reflective surface. The Applicant has further appreciated that this loss can be ameliorated by at least partially collimating the light before it impinges on the diffractions gratings and by configuring the optical displacement sensor such that the grating period p and the optical path length L satisfy the relationship of Equation 1 for each grating.

The relationship of Equation 1 ameliorates these losses due to the properties of the diffraction pattern that arises when a plane wave is diffracted by a periodic grating. When a plane wave is diffracted by a periodic grating, a repeating pattern is produced in which an image of the grating is repeated at regular distances away from the plane of the grating. The regular distance is the Talbot length $T_z$. At half the Talbot length, and at odd multiples of half the Talbot length, the diffracted light is an image of the grating, but the image is translated laterally by half a grating period.

In accordance with the present invention, the optical path length L is such that after the first portion of light impinges on and is diffracted by the grating, it propagates a total distance 2L before impinging on the grating again after being reflected by the reflective surface.

According to the relationship of Equation 1, 2L corresponds to an integer number of Talbot lengths, which means that the repeating self-image of the grating in the diffracted first light portion coincides with the position of the actual diffraction grating. This causes more light to be coupled via the diffraction grating (i.e. transmitted or reflected by the grating towards the photo detector(s)), so that it can propagate to the photo detector(s) where it contributes to the detected signal.

The Applicant has also appreciated that a similar benefit can be obtained when 2L corresponds to an odd multiple of half of the Talbot length. Thus when viewed from a second aspect, the invention provides an optical displacement sensor comprising:

- a reflective surface;
- one or more diffraction gratings spaced from the reflective surface, wherein the or each diffraction grating together with the reflective surface defines a respective interferometric arrangement, and wherein either i) the reflective surface or ii) the or each diffraction grating is moveable relative to the other;
- a light source arranged to provide light to said interferometric arrangement(s) such that, for each interferometric arrangement, a first portion of said light propagates along a first optical path via the interferometric arrangement and a second portion of said light propagates along a second, different optical path via said interferometric arrangement, thereby giving rise to an optical path difference between the first and second optical paths which depends on a separation between the reflective surface and the diffraction grating of the interferometric arrangement; and
- for each interferometric arrangement, a respective set of one or more photo detector(s) arranged to detect at least part of an interference pattern generated by said first and second portions of light dependent on said optical path difference;
- a collimating optical arrangement arranged to at least partially collimate the light between the light source and the diffraction grating(s);
- wherein, for the or each interferometric arrangement, when the reflective surface or the diffraction grating is in a zero-displacement position, the diffraction grating is spaced from the reflective surface by a distance such that the respective first portion of light travels along an optical path length L between the diffraction grating and the reflective surface;
- wherein the or each diffraction grating comprises a periodic diffraction grating with a grating period p such that for the or each interferometric arrangement, the grating period p and the optical path length L satisfy the relationship:

$$L = \frac{T_z m}{4}, \quad \text{[Equation 3]}$$

to within 20% of $$\frac{T_z}{4},$$

where m is an odd integer;
where $T_z$ is the Talbot length, defined by:

$$T_z = \frac{\lambda}{1 - \sqrt{1 - \frac{\lambda^2}{p^2}}}, \quad \text{[Equation 4]}$$

where λ is the wavelength of the light.

According to the relationship of Equation 3, 2L corresponds to an odd multiple of half of the Talbot length, which means that the repeating self-image of the grating in the diffracted first light portion coincides with the actual diffraction grating but is translated laterally by half a grating period. This causes most light to be reflected from the diffraction grating back towards the reflective surface, which in turn reflects it back again to the diffraction grating, i.e. such that the light undergoes another round trip of a distance 2L. When this light impinges on the diffraction grating again, it will have travelled a total distance 4L, i.e. two round trips between the diffraction grating and the reflective surface. In this case, according to the relationship of Equation 3, 4L corresponds to an integer number of Talbot lengths. The repeating self-image of the grating in the diffracted first light portion after two round trips therefore coincides with the position of the actual diffraction grating. This causes more light to be coupled via the diffraction grating (i.e. transmitted or reflected by the grating towards the photo detector(s)), so that it can propagate to the photo detector(s) where it contributes to the detected signal. This configuration may provide an additional advantage in that it may double the sensitivity of the optical displacement sensor to movement of the reflective surface or the diffraction grating(s), owing to the light undergoing two round trips in the gap between the reflective surface and the diffraction grating(s).

The collimation of the light contributes to this effect because it means that the angle of propagation of the light does not vary with position across the surface of the grating (or varies less than if the light were not at least partially collimated). Consequently, for a given perpendicular separation between the diffraction grating and the reflective surface, the optical path length L also does not vary (or varies less) across the surface of the diffraction grating, which means that the relationship of Equation 1 or Equation 3 may be satisfied across all or substantially all positions across the diffraction grating surface, contributing to the reduction of light losses.

It is to be understood that the relationship of Equation 1 does not need to be satisfied precisely for the benefit of reducing light losses to be provided to a significant, useful extent. The Applicant has found that a useful reduction in light losses can be achieved if the optical path length L satisfies Equation 1 to within a margin of 20% of $$\frac{T_z}{2}.$$

In a set of embodiments, the grating period p and the optical path length L satisfy the relationship of Equation 1 to within 15% of $$\frac{T_z}{2}.$$

It is to be understood that the relationship of Equation 3 does not need to be satisfied precisely for the benefit of reducing light losses to be provided to a significant, useful extent. The Applicant has found that a useful reduction in light losses can be achieved if the optical path length L satisfies Equation 3 to within a margin of 20% of $$\frac{T_z}{4}.$$

In a set of embodiments, the grating period p and the optical path length L satisfy the relationship of Equation 3 to within 15% of $$\frac{T_z}{4}.$$

The optical displacement sensor preferably comprises a membrane, wherein the reflective surface comprises or is provided on a surface of the membrane.

In embodiments in which the reflective surface is moveable relative to the diffraction grating(s), the reflective surface may be provided in or on, or comprise part of, a moveable member. The diffraction grating(s) may be fixed relative to the light source and photo detector(s), for example, the optical displacement sensor may comprise a substrate and the diffraction grating(s) may be provided in or on, or may comprise part of, the substrate.

In embodiments in which the or each diffraction grating is moveable relative to the reflective surface, the diffraction grating(s) may be provided in or on, or comprise part of, a moveable member. The reflective surface may be fixed relative to the light source and photo detector(s), for example, the optical displacement sensor may comprise a substrate and the reflective surface may be provided in or on, or may comprise part of, the substrate.

As non-limiting examples, the moveable member may be a membrane, or a proof mass (e.g. in an accelerometer or geophone).

It is to be understood that in the context of "a reflective surface", reflective means that the surface is at least partially reflective, although it may be substantially or completely reflective, e.g. depending on the particular configuration of the optical displacement sensor.

When it is said that the or each diffraction grating comprises a periodic grating, it is to be understood that this means that the or each diffraction grating comprises a set of equally spaced, parallel grating lines. Where multiple diffraction gratings are provided, preferably each diffraction grating lies in a respective plane, wherein the planes of all of the gratings are parallel to each other. More generally, preferably the or each diffraction grating lies in a plane that is parallel to a plane of the reflective surface such that the relative movement of the reflective surface and the diffraction grating(s) is perpendicular to said planes. It is to be understood that this neglects any deviation from a plane owing to slight deformation of the reflective surface or diffraction grating(s) during movement.

Preferably the or each diffraction grating is fabricated such that the grating lines have a high reflectance e.g. relative to the regions between the grating lines, for light impinging on the side of the diffraction grating(s) facing the light source. This may help to provide a high diffraction efficiency.

In embodiments in which the relationship according to Equation 1 applies, preferably the grating lines have a low reflectance for light impinging on the side of the diffraction grating(s) facing the reflective surface, e.g. low relative to the reflectance of the grating lines for light impinging on the side of the diffraction grating(s) facing the light source. This may help to reduce multiple internal reflections of the light in the gap between the diffraction grating(s) and the reflective surface, which may help to improve the optical displacement sensor performance, e.g. by increasing the benefits provided in accordance with the first aspect of the invention where Equation 1 applies, as discussed above.

In embodiments in which the relationship according to Equation 3 applies, preferably the grating lines have a high reflectance e.g. relative to the regions between the grating lines, for light impinging on the side of the diffraction grating(s) facing the reflective surface. This may help to reflect the light back towards the reflective surface after its first round trip, so that it undergoes a second round trip between the diffraction grating and the reflective surface. This may help to improve the optical displacement sensor performance, e.g. by increasing the benefits provided in accordance with the second aspect of the invention where Equation 3 applies, as discussed above.

The high and low reflectance properties described above may be provided by suitable coatings (e.g. multilayer coatings, anti-reflection coatings, etc.) or other surface treatments (e.g. anti-reflection treatments), e.g. applied to the grating lines and/or to the regions between the grating lines.

The wavelength $\lambda$ of the light may be a wavelength that characterises a finite spectrum of wavelengths produced by the light source. For example, the wavelength may be a peak wavelength or a centre wavelength of a wavelength spectrum of the light.

A "zero-displacement position" in this context means the equilibrium position that the reflective surface or the diffraction grating would adopt if it were not subject to any resultant external forces which it is designed to measure.

The collimating optical arrangement may comprise a single optical element, or it may comprise multiple elements.

The term "photo detector" as used herein is not limited to discrete photo detector devices (e.g. photo diodes) but may also include devices that separately detect light incident on more than one region thereof, e.g. a CCD wherein different pixels or regions of pixels each provide a separate signal for incoming light incident thereon.

In a set of embodiments, the optical displacement sensor comprises at least two diffraction gratings. The optical path length L may be different for each diffraction grating, e.g. as discussed below, this is preferably achieved by configuring the optical displacement sensor such that between each diffraction grating and the reflective surface there is a perpendicular optical path length which is different for each diffraction grating. Such arrangements may advantageously allow the dynamic range of the optical displacement sensor to be extended, for example as described in WO 2014/202753. The different optical path lengths provide different phase offsets, resulting in multiple optical signals with relative phase offsets. Combining the signals to provide an optical measurement can extend the operation range of the optical displacement sensor.

In a set of embodiments, between each diffraction grating and the reflective surface there is a perpendicular optical path length which is different for each diffraction grating. The difference in perpendicular optical path length may be provided by positioning the diffraction gratings with different height offsets relative to the reflective surface, e.g. by providing the diffraction gratings on a substrate having a stepped profile. The different height offsets may be provided by etched recesses of different depths in the substrate, e.g. wherein the diffraction gratings are provided in the recesses. The difference in perpendicular optical path length may be provided by regions of different height (e.g. a stepped profile or etched recesses) in the reflective surface, e.g. where the reflective surface is fixed and the diffraction gratings move relative to the reflective surface. It is therefore to be understood that the reflective surface need not be a single, planar surface, but may for example comprise multiple regions or facets, e.g. each having a different height offset relative to a moveable member having the gratings thereon. However, it is not essential for the difference in optical path lengths to be provided by a difference in the physical distance between the diffraction gratings and the reflective surface. The difference in optical path length may be provided in other ways, without necessarily requiring a substrate having a non-planar profile, e.g. using optical delay films.

It is to be understood that although the reflective surface need not be a single, planar surface, but may for example comprise multiple regions or facets, this does not imply that the surface may comprise separate, independently moveable surfaces. For example, the reflective surface may be provided on or form part of a common moveable member (e.g. a membrane), or the diffraction gratings may be provided on a common moveable member (e.g. a membrane).

In a set of embodiments, in the zero-displacement position the reflective surface is separated from the or each of the diffraction gratings by a perpendicular distance of at least 15 μm.

In embodiments having more than one diffraction grating, preferably the grating period p is the same for each diffraction grating. The height offset required to introduce a phase offset will typically be very small (e.g. on the scale of a wavelength) so it is possible for all of the gratings to satisfy the above relationship of Equation 1 or Equation 3 within the stated margin, even with phase offsets provided by height offsets. For example, a typical zero-displacement spacing between the reflective surface and the gratings may be in the range 30 μm to 40 μm, or greater than 30 μm, e.g. greater than 40 μm. This may advantageously help to reduce damping. The corresponding grating period (e.g. corresponding to the range 30 μm to 40 μm) may be in the range 5 μm to 6 μm, which can provide suitable diffraction angles, e.g. at a wavelength of 850 nm.

When it is said that the collimating arrangement at least partially collimates the light, this means that the light emerging from the collimating optical arrangement has a smaller beam angle than the light impinging on the collimating optical arrangement. The beam may be converging or diverging, i.e. the beam angle may refer to the angle at which the beam converges or diverges. Preferably the collimating optical arrangement fully or substantially fully collimates the light, e.g. such that the beam angle of the light after collimation is less than 10°, e.g. less than 5°, e.g. less than 2°, e.g. less than 1°, e.g. less than 0.5%, e.g. less than 0.1%. In a set of embodiments, the collimating optical arrangement is or comprises a lens.

As noted above, the diffraction grating(s) or the reflective surface may be provided (e.g. deposited or etched) in or on a substrate (e.g. comprising a surface of the substrate). In some embodiments, the diffraction grating(s) or the reflective surface is/are on a first side of the substrate, so that the reflective surface and the diffraction grating(s) face each other, and the collimating optical arrangement is provided on a second side of the substrate, facing the light source. In some embodiments, the diffraction grating(s) or reflective surface may be provided in or on a first substrate and the collimating optical arrangement may be provided on a second substrate between the light source and the first substrate. The collimating optical arrangement may be provided on a surface of the light source, e.g. the light source may be a back-side emitting VCSEL (i.e. the emitter(s) is/are positioned at the back surface of the VCSEL and emit light out of the VCSEL through the front surface) wherein the collimating optical arrangement may be provided on (e.g. etched into) the emitting (i.e. front) surface thereof.

The interferometric arrangement(s) may be configured such that the diffraction grating(s) is/are positioned between the light source and the reflective surface. The photo detector(s) may be provided on the same side of the interferometric arrangement(s) as the light source, e.g. adjacent the light source. The light source and photo detector(s) may be provided on a common optoelectronics substrate. The interferometric arrangement(s) may be configured such that that reflective surface is positioned between the light source and the diffraction grating(s). The photo detector(s) may be provided on the opposite side of the interferometric arrangement(s) from the light source, e.g. facing the diffraction grating(s).

The substrate(s) may be made from any suitable material, e.g. silicon or glass.

The light source may comprise a laser, e.g. a vertical-cavity surface-emitting laser (VCSEL), e.g. a back-side emitting VCSEL. The VCSEL may comprise one or more optical elements (e.g. the collimating optical arrangement and/or the beam-separating optical arrangement) on a surface thereof.

In a set of embodiments, the optical displacement sensor comprises two or more diffraction gratings; and a) each diffraction grating comprises a set of parallel grating lines extending in a respective grating line direction, and wherein the grating line direction of each diffraction grating in a set of said diffraction gratings is different from the grating line direction of each other diffraction grating in said set; and/or b) the optical displacement sensor comprises a beam-separating optical arrangement arranged to separate the light into two or more beams, wherein each of the two or more beams is directed onto a respective one of the diffraction gratings.

This is novel and inventive in its own right and thus when viewed from a third aspect the invention provides an optical displacement sensor comprising:

a reflective surface;

two or more diffraction gratings spaced from the reflective surface, wherein each diffraction grating together with the reflective surface defines a respective interferometric arrangement, and wherein either i) the reflective surface or ii) the diffraction gratings is/are moveable relative to the other;

a light source arranged to provide light to said interferometric arrangements such that, for each interferometric arrangement, a first portion of said light propagates along a first optical path via the interferometric arrangement and a second portion of said light propagates along a second, different optical path via said interferometric arrangement, thereby giving rise to an optical path difference between the first and second optical paths which depends on a separation between the reflective surface and the diffraction grating of the interferometric arrangement; and for each interferometric arrangement, a respective set of one or more photo detector(s) arranged to detect at least part of an interference pattern generated by said first and second portions of light dependent on said optical path difference;

a collimating optical arrangement arranged to at least partially collimate the light between the light source and the diffraction grating(s);

and wherein:

a) each diffraction grating comprises a set of parallel grating lines extending in a respective grating line direction, and wherein the grating line direction of each diffraction grating in a set of said diffraction gratings is different from the grating line direction of each other diffraction grating in said set; and/or b) the optical displacement sensor comprises a beam-separating optical arrangement arranged to separate the light into two or more beams, wherein each of the two or more beams is directed onto a respective one of the diffraction gratings.

In a set of embodiments in accordance with the first and/or second aspects of the invention, the optical displacement sensor comprises two or more diffraction gratings; and the light source comprises a plurality of light source elements such that the light is provided as a plurality of beams of light, wherein each light source element provides a respective one of said beams, and wherein each beam of light is directed onto a respective one of the diffraction gratings. Such embodiments may also be provided with feature a) as set out above.

This is novel and inventive in its own right and thus when viewed from a fourth aspect the invention provides an optical displacement sensor comprising:

a reflective surface;

two or more diffraction gratings spaced from the reflective surface, wherein each diffraction grating together with the reflective surface defines a respective interferometric arrangement, and wherein either i) the reflective surface or ii) the diffraction gratings is/are moveable relative to the other;

a light source arranged to provide light to said interferometric arrangements such that, for each interferometric arrangement, a first portion of said light propagates along a first optical path via the interferometric arrangement and a second portion of said light propagates along a second, different optical path via said interferometric arrangement, thereby giving rise to an optical path difference between the first and second optical paths which depends on a separation between the reflective surface and the diffraction grating of the interferometric arrangement; and for each interferometric arrangement, a respective set of one or more photo detector(s) arranged to detect at least part of an interference pattern generated by said first and second portions of light dependent on said optical path difference;

a collimating optical arrangement arranged to at least partially collimate the light between the light source and the diffraction grating(s);

wherein the light source comprises a plurality of light source elements such that the light is provided as a plurality of beams of light, wherein each light source element provides a respective one of said beams, and wherein each beam of light is directed onto a respective one of the diffraction gratings.

The plurality of light source elements may be arranged in an array. The light source may comprise a vertical-cavity surface-emitting laser (VCSEL) with multiple emitters (i.e. so that each one the multiple emitters is one of the light source elements). The light source may comprise a front-side emitting VCSEL or a back-side emitting VCSEL. The VCSEL may comprise one or more optical elements (e.g. the collimating optical arrangement) on a surface thereof. The light source elements may be operable independently (e.g. individually or in sub-groups). This may, for example, allow power-saving modes of operation of the optical displacement sensor.

The collimating optical arrangement may be arranged to at least partially collimate each beam of the plurality of beams of light, e.g. the collimating optical arrangement may comprise a plurality of collimating optical elements wherein each of said collimating optical elements is arranged to at least partially collimate a respective one of said beams of light. Embodiments in accordance with the fourth aspect may also be provided with feature a) as set out above in relation to the third aspect.

Optional features of the first and second aspects may, where applicable, also be features of the third and fourth aspects.

The beam-separating optical arrangement may comprise a single optical element, or it may comprise multiple elements. The beam-separating optical arrangement may be or comprise a beamsplitter, e.g. a diffractive beamsplitter. The beam-separating optical arrangement may be refractive or diffractive, e.g. the beam-separating optical arrangement may be or comprise a diffraction grating.

The beam-separating optical arrangement may direct the beams onto or towards their respective diffraction gratings. The beam-separating optical arrangement may at least partially collimate the beams.

The beam-separating optical arrangement may comprise the collimating optical arrangement. The collimating optical arrangement and the beam-separating optical arrangement may be formed as a single component that performs both the function of at least partially collimating the light and the function of separating the light into two or more beams. Non-limiting examples of elements that may be used to collimate and split the beam include synthetic phase hologram elements and refractive lenses with multiple facets.

As noted above, the diffraction grating(s) or the reflective surface may be provided (e.g. deposited or etched) in or on a substrate (e.g. comprising a surface of the substrate). In some embodiments, the diffraction grating(s) or the reflective surface is/are on a first side of the substrate, so that the reflective surface and the diffraction grating(s) face each other, and beam-separating optical arrangement is provided on a second side of the substrate, facing the light source. In some embodiments, the diffraction grating(s) or reflective surface is/are provided in or on a first substrate and beam-separating optical arrangement is provided on a second substrate between the light source and the first substrate.

The beam-separating optical arrangement may be provided on a surface of the light source, e.g. the light source may be a back-side emitting vertical-cavity surface-emitting laser (VCSEL) wherein the beam-separating optical arrangement may be provided on (e.g. integrally formed in/on, mounted on or etched into) the front surface thereof. For example, the beam-separating optical arrangement may comprise a lens (e.g. a faceted lens) formed on a surface of the light source. As another example, the beam-separating optical arrangement may comprise a diffraction grating etched into the surface of the light source.

Providing the beam-separating optical arrangement on a surface of the light source may provide various advantages. For example, it may make alignment of the optical displacement sensor's optical components easier at the wafer-scale. It may make the optical displacement sensor more compact. It may make the optical displacement sensor easier to incorporate in a package (e.g. a microphone housing) due to having fewer components.

The provision of either or both of features a) and b), or the provision of a plurality of light source elements each providing a beam directed onto a respective one of the gratings, provides the technical effect of spatially separating the light that passes through each interferometric arrangement so that it can be more easily collected by different photo detectors to produce separate signals for each diffraction grating.

In the case of feature a), the beam is spatially separated at least as a result of the different orientations of the grating lines. When a beam impinges on a periodic diffraction grating, the diffraction orders that are created are spatially separated in the direction perpendicular to the grating lines. Accordingly, when a beam impinges on multiple diffraction gratings having different grating line orientations, this creates multiple sets of diffractions orders (one for each grating), wherein each set of diffraction orders is spatially separated in a different plane (and thus the sets of diffraction orders are spatially separated from each other). The light may impinge normally on the gratings, e.g. as a beam of light incident on an area that overlaps with multiple gratings. In that case, the grating orientations alone may serve to separate the light into separate channels comprising the different sets of diffraction orders.

In the case of feature b), the light is spatially separated at least due to the beam-separating optical arrangement separating the light into multiple beams (e.g. one for each diffraction grating). In the case of the feature of the plurality of light source elements providing a plurality of beams, the light beams are spatially separated due to being provided by spatially separated light source elements.

The beams may be described as "off-axis", e.g. relative to a beam axis of the light impinging on the beam-separating optical arrangement, e.g. where each beam propagates at an angle to said axis. As the beams impinging on the diffraction gratings are spatially separated, the sets of diffraction orders created by the gratings will also be spatially separated.

The beams may impinge on the diffraction gratings at an angle to a normal to a plane in which the respective diffraction grating lies. Each beam may be collimated or substantially collimated, e.g. by a separate collimating optical arrangement or by the beam-separating optical arrangement. Preferably the direction of propagation of each beam is in a plane that is i) parallel to the grating line direction of the diffraction grating on which said beam impinges and ii) perpendicular to a plane in which said diffraction grating lies. Such an orientation may advantageously help to provide the benefits of the features of the first and second aspects of the invention relating to ameliorating light losses due to diffraction.

The optical displacement sensor may have exactly two diffraction gratings. Any optional features described herein in the context of embodiments having exactly two gratings may, where applicable, also be optional features of embodiments comprising three or more diffraction gratings.

In a set of embodiments, each beam impinges on its respective diffraction grating at a respective incidence angle to a normal to a plane in which the respective diffraction grating lies, wherein the incidence angle for each diffraction grating is different from the incidence angle of each other diffraction grating.

In a set of embodiments, each beam impinges on its respective diffraction grating at a respective incidence angle to a normal to a plane in which the respective diffraction grating lies, wherein the incidence angle for each diffraction grating in a set of said diffraction gratings is different from the incidence angle of each other diffraction grating in said set.

It is to be understood that two incidence angles may be considered different from each other if they have the same polar angle with respect to the normal but a different azimuthal angle, or the same azimuthal angle with respect to the normal but a different polar angle, or a different polar angle and a different azimuthal angle with respect to the normal.

For example, in embodiments having exactly two gratings, the gratings may have the same orientation and be spaced from each other in a direction parallel to the grating line direction. Respective beams may impinge on each grating at respective incidence angles which have the same polar angle but an azimuthal angle that differs by 180°.

In a set of embodiments, a beam direction of the light or of a beam of light impinging on the diffraction gratings is perpendicular to a surface of the diffraction gratings.

In some embodiments, each diffraction grating is oriented along a line of a set of lines extending radially from a centre point between the gratings. It is to be understood that "oriented along a line" means that the grating overlaps with said line and has its grating line direction parallel to said line.

In a set of embodiments, the optical displacement sensor comprises N gratings, wherein the diffraction gratings are oriented at an angle of (360°)/N or a multiple thereof with respect to each other.

It is to be understood that the orientation of a diffraction grating refers to the orientation of its grating lines.

In some embodiments, the or each interferometric arrangement comprises a pair of diffraction gratings having the same grating period and the same grating line direction, and being separated from the reflective surface by the same optical distance, such that the pair of diffraction gratings function together to direct light onto the same set of one or more photo detectors corresponding to said interferometric arrangement.

In a set of embodiments, the diffraction gratings are arranged in a rotationally symmetric composite diffraction grating. For example, the diffraction gratings may comprise sectors or diametrically opposed pairs of sectors of a circle, or triangles or diametrically opposed pairs of triangles in a hexagon, octagon, or other polygon. It is to be understood that the rotational symmetry refers to the positions of the diffraction gratings around an axis of the composite diffraction grating and not necessarily to all properties of the gratings (e.g. the gratings may have different height offsets in a way that is not rotationally symmetric).

Spatial separation of the created sets of diffraction orders as discussed above may advantageously allow the orders to be directed more easily onto the photo detectors, e.g. using a beam-steering optical arrangement.

In a set of embodiments, the optical displacement sensor comprises a beam-steering optical arrangement arranged to direct the first and second light portions for each interferometric arrangement onto the respective photo detector(s) provided for said interferometric arrangement.

The beam-steering optical arrangement may comprise one or more beam-steering optical elements, e.g. one or more refractive and/or diffractive optical elements.

The beam-steering optical arrangement may comprise a plurality of prisms or gratings, which may, for example, be etched into the substrate surface or patterned on the substrate surface e.g. using a polymer.

In a set of embodiments, the beam-separating optical arrangement and the beam-steering optical arrangement are provided on a common substrate. For example, with the beam-steering optical arrangement may be positioned around (e.g. surrounding) the beam-separating optical arrangement, e.g. plural beam-steering optical elements positioned around the beam-separating optical arrangement.

The beam-steering optical arrangement may advantageously provide greater freedom in the positioning of the photo detector(s) and/or other components. For example, the beam-steering optical arrangement may comprise plural beam-steering optical elements each configured to direct a respective beam on to one of the photo detectors. This may be particularly useful in embodiments having three, four or more gratings. Preferably the photo detector(s) and other components associated with each interferometric arrangement are arranged with sufficient spacing to avoid overlap with light paths associated with the other interferometric arrangements. The greater the number of gratings, the more restricted the space becomes for placement of the photo detectors and other components, and so greater freedom of placement is helpful in those cases.

Preferably the beam-steering optical arrangement is provided in combination with feature b) above, although it may be provided in combination with both feature a) and b) or with feature a) and/or the feature of the plurality of light source elements. Separating the light into multiple beams before the light impinges on the gratings (e.g. where each beam is at an angle to the surface normal of the diffraction gratings) may advantageously provide an additional degree of freedom which may be useful in steering the beams onto the photo detector(s). This may make alignment of the optical displacement sensor, and in particular the photo detectors, easier, e.g. by allowing greater tolerances for positioning of the photo detectors and other components. A further, particular advantage is that it may enable the detection of the $0^{th}$ diffraction order (which may, for example, otherwise be directed straight back towards the source such that it may not be possible to position a photo detector to receive the $0^{th}$ diffraction order).

It will be understood that when light impinges on a periodic diffraction grating, the light will be diffracted into multiple diffraction orders, including a central diffraction order (usually referred to as the $0^{th}$ or zeroth diffraction order), and a diffraction order on each side of the central diffraction order, separated in a direction perpendicular to the grating line direction. These two orders may be referred to as first diffraction orders, or $+1^{st}$ and $-1^{st}$ diffraction orders.

In a set of embodiments, each set of one or more photo detectors comprises two photodetectors and said photo detectors are arranged such that a $+1^{st}$ diffraction order impinges on a first one of said photo detectors and a $-1^{st}$ diffraction order impinges on a second one of said photo detectors.

Such an arrangement of the photo detectors may be provided in embodiments in which the light is not separated prior to impinging on the diffraction gratings, and where the light is normally incident on the diffraction gratings. In such embodiments, the $0^{th}$ diffraction order may be directed back towards the light source, with the $+1^{st}$ and $-1^{st}$ diffraction orders being directed at an angle to the grating surface normal such that the $+1^{st}$ and $-1^{st}$ diffraction orders are spatially separated from the $0^{th}$ order in a direction perpendicular to the grating line direction. This spatial separation means that the $+1^{st}$ and $-1^{st}$ diffraction orders do not propagate back in the direction of the source, and so the photo detectors can be suitably positioned to receive the $+1^{st}$ and $-1^{st}$ diffraction orders.

In a set of embodiments, each set of one or more photo detectors comprises three photodetectors wherein said photo detectors are arranged such that a $+1^{st}$ diffraction order impinges on a first one of said photo detectors, a $0^{th}$ diffraction order impinges on a second one of said photo detectors and a $-1^{st}$ diffraction order impinges on a third one of said photo detectors.

Such an arrangement of the photo detectors may be provided in embodiments in which the light is separated prior to impinging on the diffraction gratings, and where the light impinges on the diffraction gratings at an angle to a normal to the plane in which the grating lies. In such arrangements, the $-1^{st}$, $0^{th}$ and $+1^{st}$ diffraction orders typically will not propagate back in the direction of the light source, and will be spatially separated from each other, such that the photo detectors can be positioned to receive the $-1^{st}$, $0^{th}$ and $+1^{st}$ diffraction orders. This may advantageously allow a differential signal to be generated, due to the properties of the diffraction orders. Owing to the symmetry in the arrangement, the detected intensity of the $-1^{st}$ and $+1^{st}$ diffraction orders will typically be the same, but the $0^{th}$ order provides a different signal that can be used together with the $-1^{st}$ and/or $+1^{st}$ diffraction orders to produce a differential signal. In these and other embodiments, the signals from the $-1^{st}$ and $+1^{st}$ diffraction orders may be combined into a single signal, e.g. the signals from the photo detectors positioned to receive the $-1^{st}$ and $+1^{st}$ diffraction orders may be summed.

The invention extends to an optical microphone (and other types of pressure sensor) comprising an optical displacement sensor as described above. However, other applications are possible within the scope of the invention. The invention extends to an accelerometer or geophone comprising an optical displacement sensor as described above. More generally, the optical displacement sensor may provide a measurement of an external stimulus, such as a pressure difference between two volumes of fluid, an acoustic wave or a vibration.

BRIEF DESCRIPTION OF THE DRAWINGS

Certain preferred embodiments will now be described, by way of example only, with reference to the accompanying drawings, in which.

DETAILED DESCRIPTION

Figure 1:
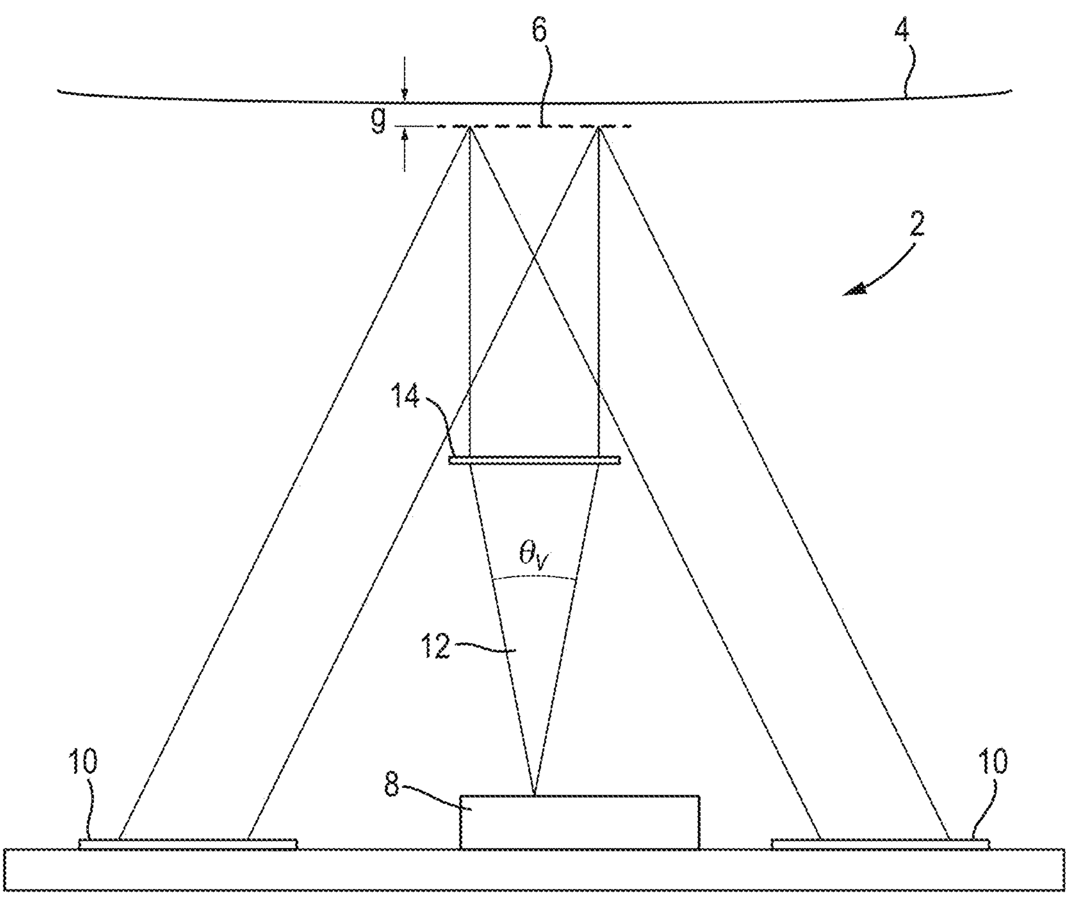
FIG. 1 shows a schematic representation of an optical displacement sensor in accordance with a first embodiment of the present invention.

FIG. 1 shows an optical displacement sensor 2 in accordance with a first embodiment of the invention. In this example, the optical displacement sensor 2 forms part of an optical microphone. The optical displacement sensor 2 comprises a membrane 4 which has a reflective surface and which vibrates in response to ambient sound waves. The optical displacement sensor 2 further comprises a composite diffraction grating 6, which is described in detail below with reference to FIG. 2. The optical displacement sensor 2 further comprises a light source 8 and six detectors 10, two of which are visible in the view shown in FIG. 1. The light source 8 is positioned to direct light 12 onto the diffraction grating 6 via a lens 14. The light 12 is emitted from the light source with a beam angle $\theta_v$. The lens 14 collimates the light 12, which then impinges on the composite diffraction grating 6 as a plane wave.

In this example and the other specific embodiments described below, it is the reflective surface of the membrane that moves relative to the diffraction grating(s), but in variations and other examples, the grating(s) may move relative to a fixed reflective surface (e.g. a surface of a substrate). For example, the composite diffraction grating in this embodiment could be fabricated on a membrane. In some variations and other examples, e.g. where a plurality of gratings is deposited on a membrane, optical phase offsets may be provided using optical delay films (e.g. instead of the height offsets discussed below), or the fixed reflective surface may provide height offsets, e.g. recesses may be provided in the reflective surface.

As the membrane vibrates in the presence of sound waves, the separation between the membrane and the composite diffraction grating changes. In FIG. 1, the separation is indicated by gap g. When the membrane is not subject to sound pressure waves, it is spaced from the composite diffraction grating by an equilibrium separation in a "zero-displacement" position, which in this example is a half-integer multiple of the Talbot length for the composite diffraction grating, i.e. it satisfies the equation:

$$L = \frac{T_z n}{2}, \quad \text{[Equation 5]}$$

where n is an integer and $T_z$ is the Talbot length, defined by:

$$T_z = \frac{\lambda}{1 - \sqrt{1 - \frac{\lambda^2}{p^2}}}, \quad \text{[Equation 6]}$$

where λ is the wavelength of the light and p is the grating period of the composite grating. Equation 7 can be approximately expressed as:

$$p \approx \sqrt{g\lambda} \quad \text{[Equation 7]}$$

In the above, L is the optical path length travelled by the light between the composite grating and the membrane. In the present example, the optical path length L for the light travelling between the composite grating and the membrane is the same as the equilibrium separation between the composite grating and the membrane, because the light is normally incident on the composite grating.

As discussed above, this condition on the optical path length L (and therefore the spacing between the membrane and the composite grating) reduces the light losses due to diffraction (e.g. through multiple reflections and absorption in the air gap between the membrane and the composite grating). It will be understood from the above disclosure that in, for example, the present embodiment, the optical path length L may instead satisfy Equation 3, which also reduces the losses due to diffraction.

Figure 2:
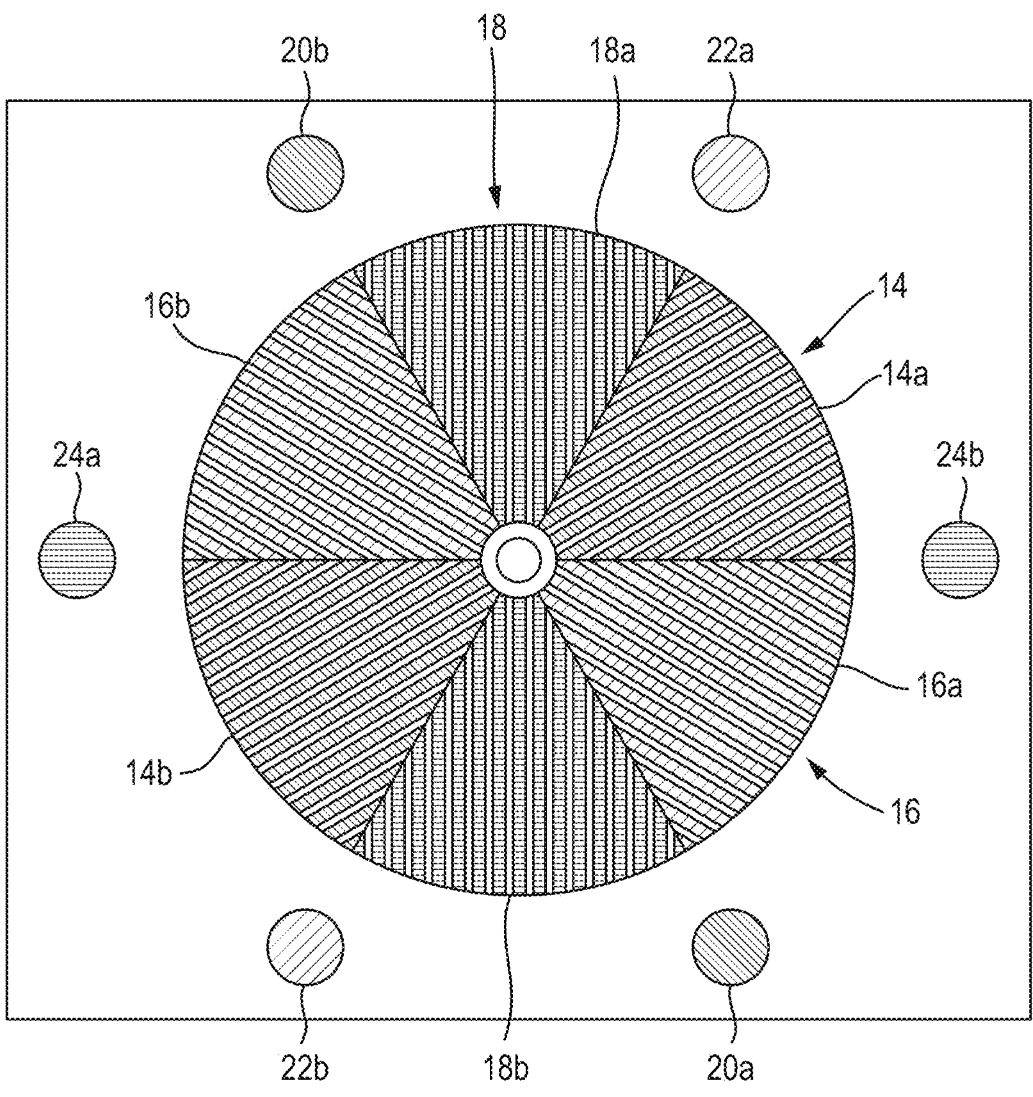
FIG. 2 shows a view of a composite diffraction grating comprising three diffraction gratings in accordance with the first embodiment, including a representation of detector locations corresponding to the three gratings.

FIG. 2 shows the composite diffraction grating 6. In this example, the composite diffraction grating 6 has a circular shape and is divided into six sectors, defining three diffraction gratings, each comprising a respective pair of diffraction grating areas. A first diffraction grating 14 comprises first diffraction grating areas 14*a*, 14*b*; a second diffraction grating 16 comprises a second pair of diffraction grating areas 16*a*, 16*b*; and a third diffraction grating 18 comprises a third pair of diffraction grating areas 18*a*, 18*b*. The diffraction grating areas 14*a*, 14*b*, 16*a*, 16*b*, 18*a*, 18*b* all have the same grating period. Each diffraction grating 14, 16, 18 has a corresponding pair of detectors. The first diffraction grating 14 corresponds to a first pair of detectors 20*a*, 20*b*. The second diffraction grating 16 corresponds to a second pair of detectors 22*a*, 22*b*. The third diffraction grating 18 corresponds to a third pair of detectors 24*a*, 24*b*.

The diffraction grating areas 14*a*, 14*b* of the first diffraction grating 14 are diametrically opposed to each other (with respect to a first diameter of the composite diffraction gating 6) and each grating area comprises a linear diffraction grating, with grating lines oriented quasi-radially. Quasi-radially in this context is used to mean that the grating lines are parallel to each other and to the first diameter. The first pair of detectors 20*a*, 20*b* are also diametrically opposed to each other (with respect to a second diameter of the composite diffraction grating that is perpendicular to the first diameter).

When the light 12 is incident on the composite diffraction grating, part of the light illuminates the first diffraction grating 14. A first portion of this part of the light is transmitted through the first diffraction grating 14, to be reflected by the membrane 4, and then is incident again on the first diffraction grating 14. The first diffraction grating 14 transmits and diffracts this first portion of light into multiple diffraction orders, including $-1^{st}$, $0^{th}$ and $+1^{st}$ diffraction orders. A second portion of the light illuminating the first diffraction grating is reflected by the first diffraction grating and diffracted into multiple diffraction orders, including $-1^{st}$, $0^{th}$ and $+1^{st}$ diffraction orders.

In each case, the $0^{th}$ diffraction order is directed back towards the source. The $-1^{st}$ and $+1^{st}$ diffraction orders emerge from the first diffraction grating at an angle to the $0^{th}$ order, and are thus spatially separated from the $0^{th}$ diffraction order in a direction perpendicular to the grating lines of the first diffraction grating. The photo detectors 20*a*, 20*b* are positioned so that the $-1^{st}$ diffraction orders are incident on one photo detector 20*a* and the $+1^{st}$ diffraction orders are incident on the other photo detector 20*b*. In each case, the incident light comprises light from the first and second portions. As the first light portion travels via the gap between the membrane and the first diffraction grating while the second portion does not, there is an optical path difference between the paths of the first and second light portions which depends on the membrane displacement. The first and second portions therefore interfere such that the intensity of light diffracted into each order depends on the membrane displacement. The intensity of the $-1^{st}$ and $+1^{st}$ diffraction detected at the photo detectors 20*a*, 20*b* can thus be used to determine the membrane displacement.

The second and third diffraction gratings have height offsets relative to the first diffraction grating, and this is discussed in detail below. Otherwise, the structure and orientation of the second diffraction grating 16 and the second pair of detectors 22*a*, 22*b* is the same as for the first diffraction grating 14 and the first pair of detectors 20*a*, 20*b*, but rotated by 60°. Similarly, the third diffraction grating 18 and the third pair of detectors 24*a*, 24*b* are rotated by 120° relative to the first diffraction grating 14 and the first pair of detectors 20*a*, 20*b*. In each case, the diffraction orders produced by the diffraction gratings are separated in a direction perpendicular to the grating lines, so the different orientations of the diffraction gratings serves to spatially separate the diffraction orders produced by each diffraction grating so that they can be directed onto different detectors.

As mentioned above, the three diffraction gratings 14, 16, 18 have relative height offsets. This is because, for a diffraction grating having a spacing relative to the membrane, there is only a relatively small range of membrane displacements for which the intensity of light diffracted into a diffraction order is approximately linear. This is shown in FIG. 3.

Figure 3:
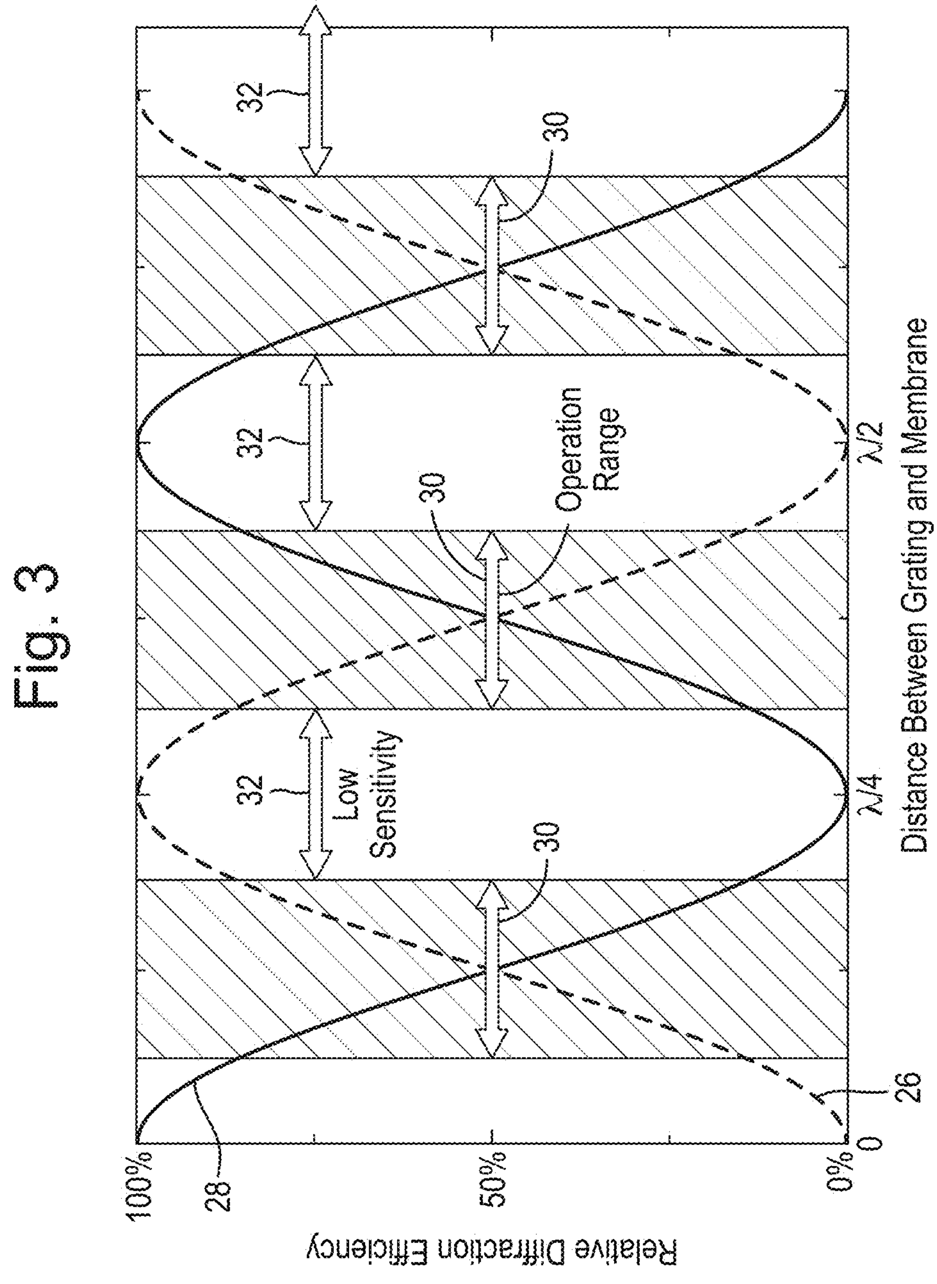
FIG. 3 shows a graph indicating the operation ranges of an optical displacement sensor having a single grating.

FIG. 3 shows the relative diffraction efficiency of the interfering transmitted and reflected portions of light. As mentioned above, for each grating 14, 16, 18, the respective detectors 20*a*, 20*b*, 22*a*, 22*b*, 24*a*, 24*b* are positioned to receive the $-1^{st}$ and $1^{st}$ order diffraction peaks. However, other orders may additionally or alternatively be detected, e.g. in other embodiments, the $0^{th}$ order may be detected in addition to the $-1^{st}$ and $+1^{st}$ orders. The first line 26 corresponds to the $0^{th}$ order peak. The second line 28 corresponds to the $+1^{st}$ order peak.

As shown in FIG. 3, the relative diffraction efficiency of the $0^{th}$ and $+1^{st}$ order peaks varies sinusoidally with distance between the membrane and grating, and the zeroth and first order peaks are in anti-phase. The sensitivity of the microphone is determined by the change in output signal for a given change in displacement of the membrane. It can be seen from FIG. 3 therefore that the maximum sensitivity occurs in the operating ranges 30 in which the lines 26, 28 have maximum gradient and are approximately linear.

Accordingly, for each grating, the motion of the membrane may only be determined with high sensitivity in operating ranges 30 of approximately $\pm\lambda/16$ (corresponding to approximately ±50 nm membrane displacement) around working points corresponding to distance between the membrane and grating of $(2n+1)\lambda/8$, where n is an integer. At other distances, there are regions of low sensitivity 32. Consequently, the dynamic range that can be detected with one grating is limited. Therefore, in the optical displacement sensor 2, the three gratings 14, 16, 18 are provided at slightly different distances from the membrane corresponding to different working points to cover a greater range of membrane positions, thus extending the dynamic range of the optical microphone.

As the height offset is on the scale of a wavelength of the light, it will be appreciated that Equation 5 (or Equation 3) can still be satisfied for multiple gratings with relative height offsets to within a suitable margin.

Figure 4B:
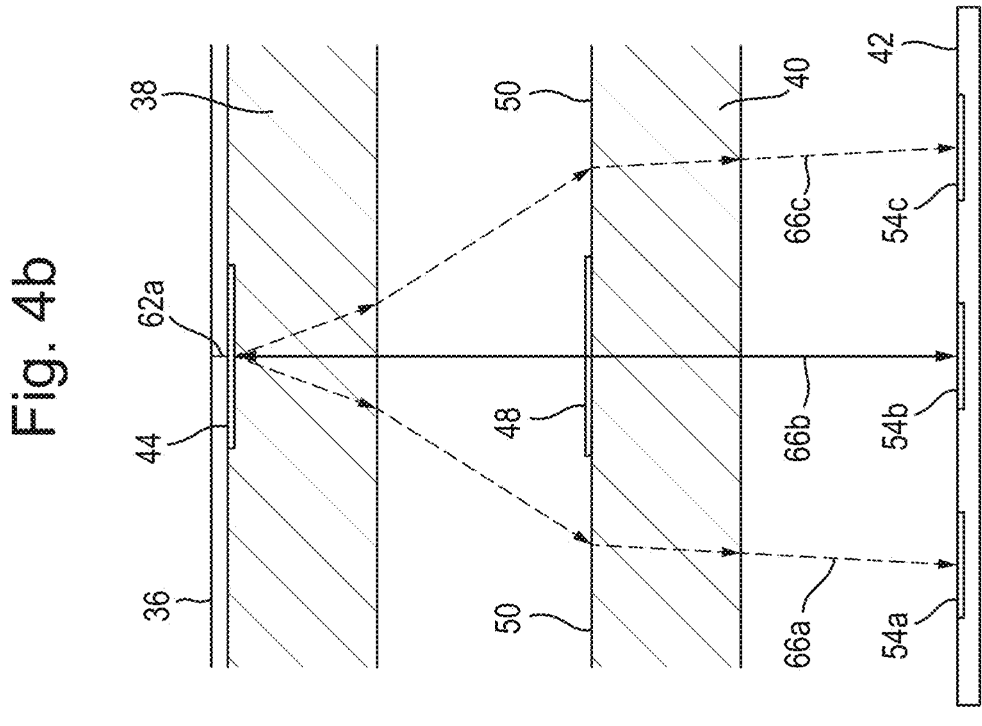
FIG. 4*b* shows a schematic side view of the optical displacement sensor of the second embodiment shown in FIG. 4*a;*
Figure 4A:
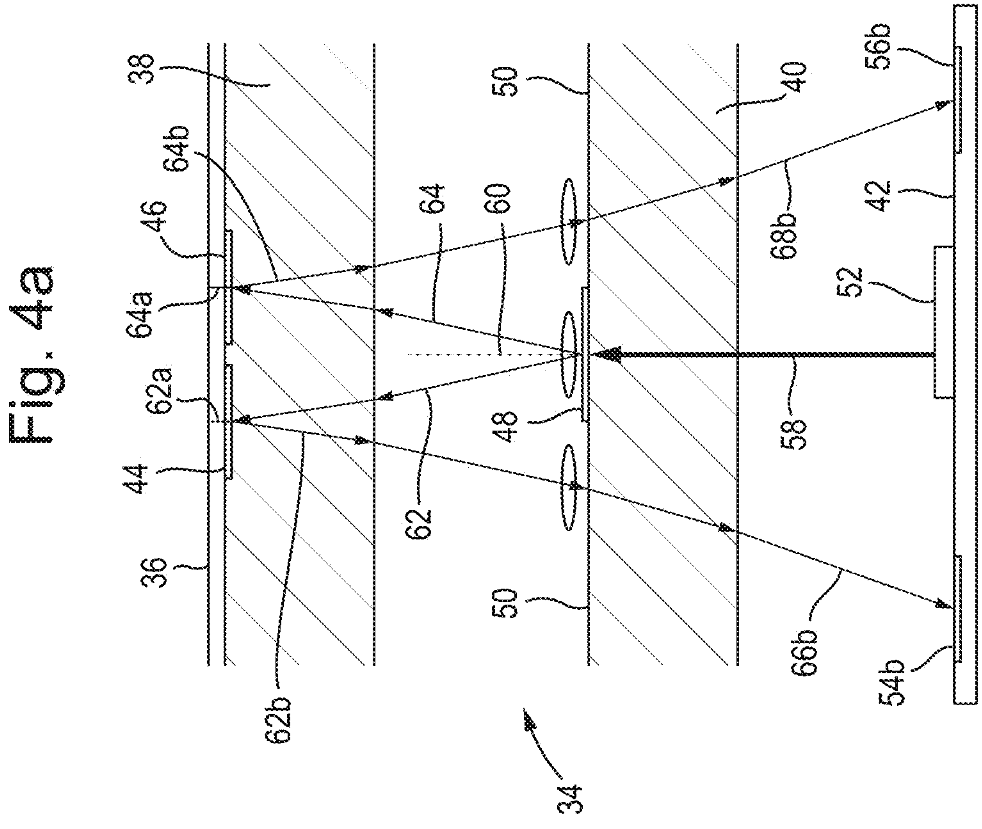
FIG. 4*a* shows a schematic front view of a second embodiment of an optical displacement sensor in accordance with the invention.
Figure 4C:
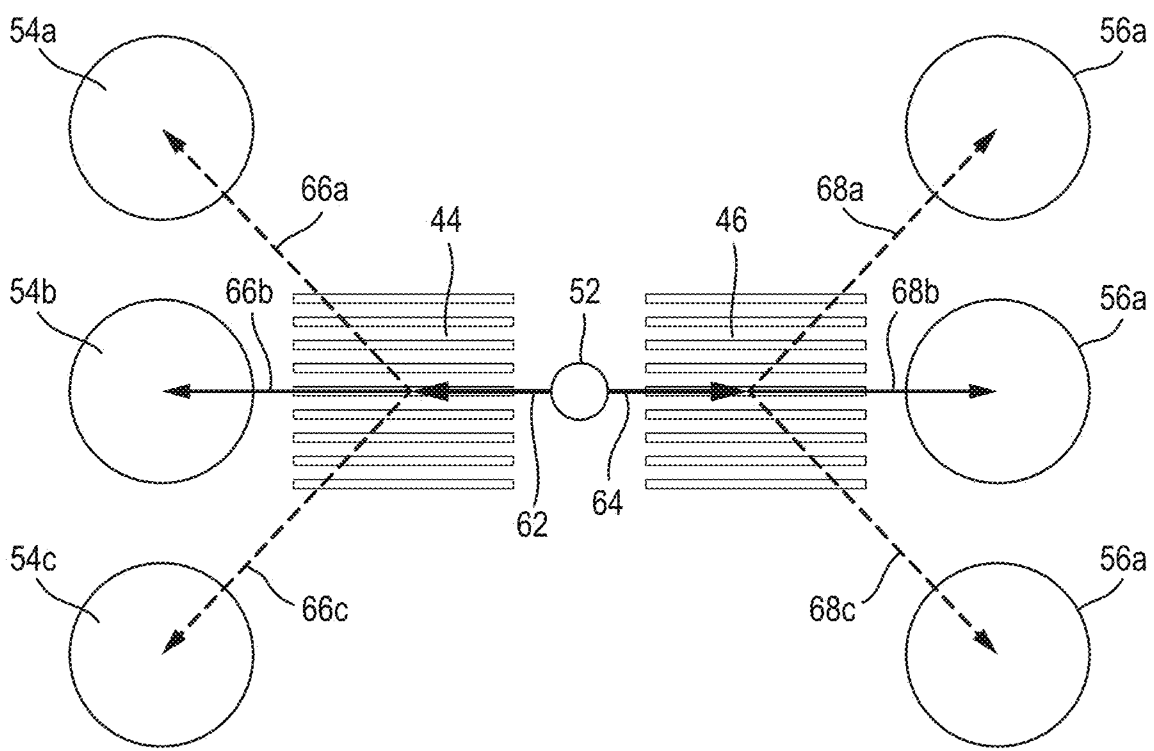
FIG. 4*c* shows a schematic plan view of the optical displacement sensor of the second embodiment shown in FIGS. 4*a* and 4*b;*

FIGS. 4*a* to 4*c* show a second embodiment of an optical displacement sensor 34 in accordance with the invention. FIG. 4*a* shows a schematic front view the optical displacement sensor 34, FIG. 4*b* shows a schematic side view of the optical displacement sensor 34, and FIG. 4*c* shows a schematic plan view of the optical displacement sensor 34.

The optical displacement sensor 34 comprises a membrane 36, a first transparent substrate 38, second transparent substrate 40 and an optoelectronics substrate 42. Two diffraction gratings 44, 46 are fabricated on the side of the first transparent substrate 38 which faces the membrane 36. The second transparent substrate 40 comprises a beam-separating optical arrangement 48 and a beam-steering optical arrangement 50 which surrounds the beam-separating arrangement 48. The beam-separating arrangement 48 in this example is in the form of a lens with multiple facets (although other arrangements may be used) so that it also provides the function of a collimator. The beam-steering optical arrangement 50 in this example comprises a plurality of prisms that are etched into the substrate surface, although other arrangements are possible. The optoelectronics substrate 42 comprises a light source 52, which in this example is a vertical-cavity surface-emitting laser (VCSEL) and six photodetectors 54*a*, 54*b*, 54*c*, 56*a*, 56*b*, 56*c* (two of which are visible in FIG. 4*a*).

The VCSEL is arranged to direct uncollimated light 58 along an axis 60 toward the beam-separating arrangement 48. The beam-separating arrangement 48 separates and collimates the uncollimated light 58 into two separate, collimated beams 62, 64, propagating at an angle to the axis 60 of the uncollimated light 58, such that each beam 62, 64 is directed onto a respective one of the diffraction gratings 44, 46. Each beam 62, 64 interacts with the respective grating 44, 46 and the membrane 36 in the same way described above with reference to FIG. 1, i.e. a first portion 62*a*, 64*a* passes through the grating 44, 46 to be reflected back by the membrane 36 to the grating 44, 46, and is then transmitted and diffracted by the grating 44, 46 into $-1^{st}$, $0^{th}$ and $1^{st}$ diffraction orders 66*a*, 66*b*, 66*c*, 68*a*, 86*b*, 68*c*. A second portion 62*b*, 64*b* is reflected and diffracted by the grating 36 into $-1^{st}$, $0^{th}$ and $1^{st}$ diffraction orders 66*a*, 66*b*, 66*c*, 68*a*, 68*b*, 68*c*. As can be seen from FIG. 4*c*, the $-1^{st}$ and $+1^{st}$ diffraction orders 66*a*, 66*c*, 68*a*, 68*c* are separated from the $0^{th}$ diffraction orders 66*b*, 86*b* such that the $-1^{st}$, $0^{th}$ and $+1^{st}$ orders 66*a*, 66*b*, 66*c*, 68*a*, 86*b*, 68*c* are spatially separated along a direction perpendicular to the grating lines of the respective diffraction grating 44, 46.

As the beam-separating arrangement 48 caused the two beams 62, 64 to propagate at an angle to the axis 60, the returning diffracted first and second portions of light (i.e. $-1^{st}$, $0^{th}$ and $+1^{st}$ orders) 66*a*, 66*b*, 66*c*, 68*a*, 86*b*, 68*c* also propagate at an angle to the axis 60. This means that the $-1^{st}$, $0^{th}$ and $+1^{st}$ orders 66*a*, 66*b*, 66*c*, 68*a*, 86*b*, 68*c* pass through the second transparent substrate 40 at regions laterally displaced relative to the beam-separating arrangement 48, such that they pass through the beam-steering optical arrangement 50. The beam-steering optical arrangement 50 refracts the $-1^{st}$, $0^{th}$ and $+1^{st}$ orders 66*a*, 66*b*, 66*c*, 68*a*, 86*b*, 68*c*, re-directing them such that each diffraction order of each beam impinges on one of the photo detectors 54*a*, 54*b*, 54*c*, 56*a*, 56*b*, 56*c*.

The arrangement of the beam-separating arrangement 48 in combination with the diffraction gratings 44, 46 causes all six diffraction orders (i.e. $-1^{st}$, $0^{th}$ and $+1^{st}$ orders from each beam) to be spatially separated such that they can be steered onto the respective photo detectors 54*a*, 54*b*, 54*c*, 56*a*, 56*b*, 56*c* by the beam-steering optical arrangement 50. The signals detected at the photo detectors 54*a*, 54*b*, 54*c*, 56*a*, 56*b*, 56*c* can then be used to generate a differential signal for each beam (i.e. corresponding to each diffraction grating).

The two diffraction gratings 44, 46 have a relative height offset (i.e. such that the signal for each beam corresponds to a different working point of the membrane 36) to extend the operating range of the optical displacement sensor 34, in a similar manner to that described above with reference to FIG. 3. In this example, the spacing between the membrane 36 and the gratings 44, 46 is such that the optical path length from the gratings 44, 46 to the membrane 36 for each beam of light is a half-integer multiple of the Talbot length (within a suitable margin, as explained above) to provide the benefits relating to reducing light losses, although this is not essential and other embodiments and variations on this embodiment may be provided without this feature.

Figure 5B:
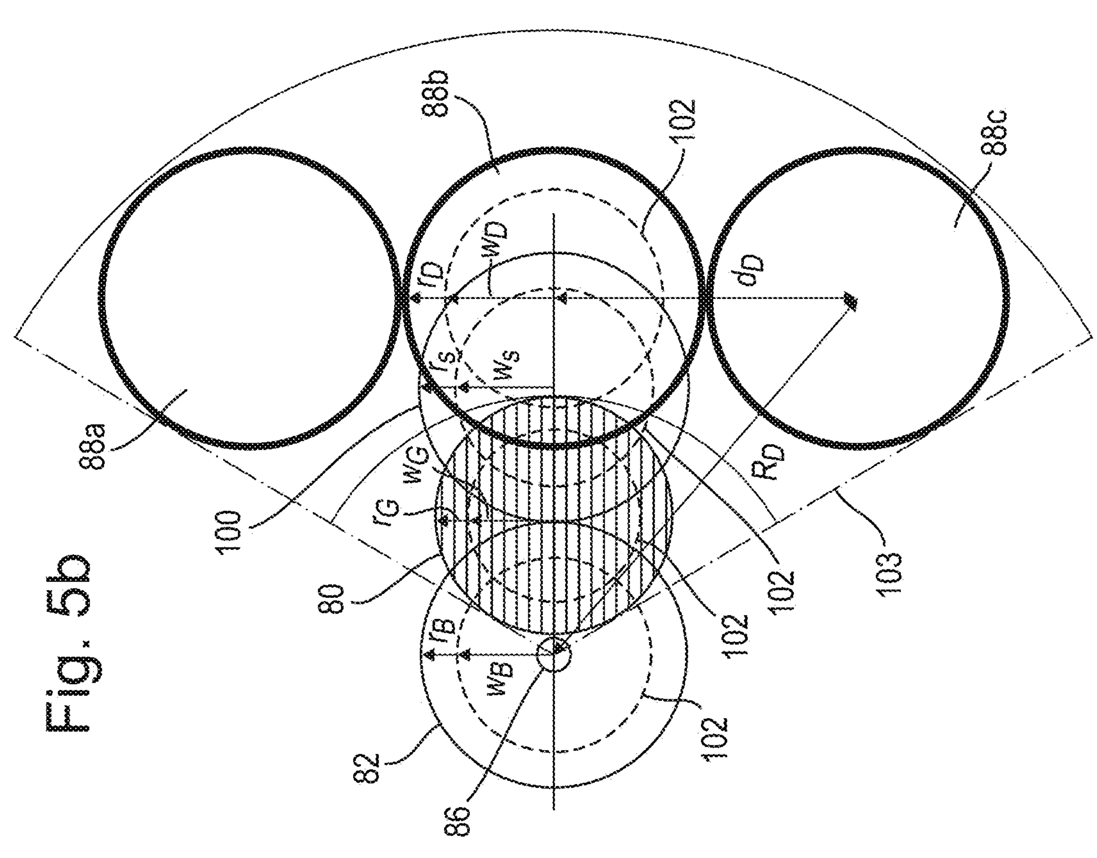
FIG. 5*b* shows a schematic plan view of the optical displacement sensor of the third embodiment shown in FIG. 5*a*, showing cross-sections of the light paths with the optical surfaces on which they impinge.
Figure 5A:
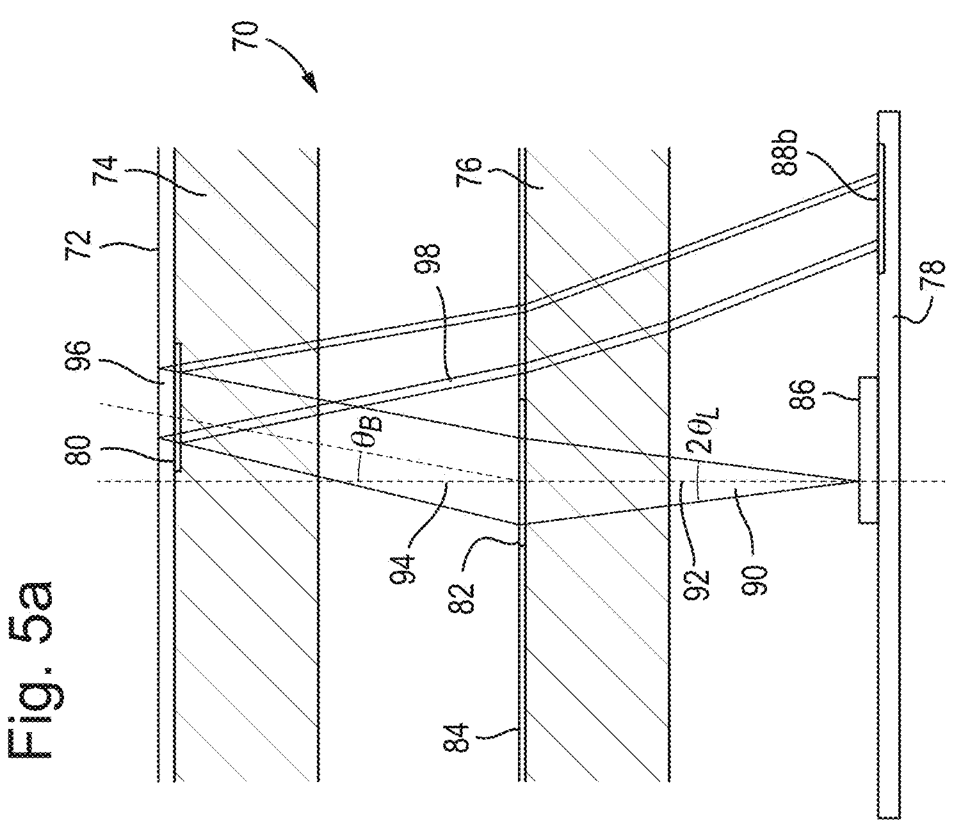
FIG. 5*a* shows a schematic front view of a third embodiment of an optical displacement sensor in accordance with the invention.

FIGS. 5*a* and 5*b* show respectively a schematic front view and a schematic plan view of a third embodiment of an optical displacement sensor 70 in accordance with the invention. The embodiment of FIG. 5*a* is similar to the embodiment of FIGS. 4*a* to 4*c*, except that the optical displacement sensor 70 comprises three gratings and three corresponding sets of photo detectors. For clarity, only one grating and one set of photo detectors is shown in FIGS. 5*a* and 5*b*. The placement of the other two gratings and sets of photo detectors is discussed below with reference to FIGS. 5*b* and 5*c*.

The optical displacement sensor 70 comprises a membrane 72, a first transparent substrate 74, second transparent substrate 76 and an optoelectronics substrate 78. FIGS. 5*a* and 5*b* show a first diffraction grating 80 fabricated on the side of the first transparent substrate 74 which faces the membrane 72. The second transparent substrate 76 comprises a beam-separating arrangement 82 and a beam-steering optical arrangement 84 which surrounds the beam-separating arrangement 82. The beam-separating arrangement 82 in this example is in the form of lens with multiple facets so that it also provides the function of a collimator, although other arrangements are possible. The beam-steering optical arrangement 84 in this example comprises a plurality of prisms etched into the substrate surface, wherein each prism is configured to refract a respective one of the beams onto one of the photo detectors, although other beam-steering optical arrangements are possible. The optoelectronics substrate 78 comprises a light source 86, which in this example is a vertical-cavity surface-emitting laser (VCSEL). FIG. 5*b* shows one set of three photodetectors 88*a*, 88*b*, 88*c* (one of which is visible in FIG. 5*a*).

As shown in FIG. 5*a*, the VCSEL 86 emits uncollimated light 90 with a beam angle of $\theta_L$. The uncollimated light 90 is directed along a beam axis 92. The beam-separating arrangement 82 separates and collimates the uncollimated light 90 into three separate, substantially collimated beams, of which a first beam 94 is shown in FIG. 5*a*. The first beam 94 propagates at an angle $\theta_B$ to the beam axis 92 towards the first diffraction grating 80, in a plane perpendicular to the first grating surface and parallel to the grating line direction of the first grating 80.

A first portion 96 of the first beam 94 passes through the first diffraction grating 80 and is reflected from the membrane 72. The reflected first portion then passes back through the diffraction grating 80, where it is diffracted into $-1^{st}$, $0^{th}$ and $1^{st}$ diffraction orders. A second portion 98 of the first beam 94 is reflected by the first grating 80, which diffracts it into $-1^{st}$, $0^{th}$ and $1^{st}$ diffraction orders. The diffraction orders are spatially separated in the direction perpendicular to the grating line direction of the first grating 80. The beam-steering optical arrangement 84 directs each of the $-1^{st}$, $0^{th}$ and $+1^{st}$ diffraction orders onto a respective one of the photo detectors 88*a*, 88*b*, 88*c*. The diffraction orders of the first and second portions 96, 98 interfere at the photo detectors 88*a*, 88*b*, 88*c*, such that the intensity of light detected at each photo detector 88*a*, 88*b*, 88*c* depends on the separation between the first grating 80 and the membrane 72. The detected intensity of light can thus be used to determine the membrane displacement as the membrane position varies.

As discussed above, the beam-separating arrangement 82 splits the uncollimated light 90 into three beams. In addition to the first beam 94, a second beam and a third beam are produced. Respective second and third diffraction gratings are used to generate respective −1st, 0th and +1st diffraction orders from the second and third beams, which are directed onto respective photo detectors in the same way as described above in relation to the first grating.

FIG. 5*b* shows the relative position of the areas occupied by the VCSEL 86, the beam-separating arrangement 82, the first grating 80, a beam-steering element 100 of the beam-steering optical arrangement 84 (configured to direct the $0^{th}$ diffraction order onto the corresponding photo detector) and the photo detectors 88*a*, 88*b*, 88*c*, when viewed in a plan view. The dotted circles 102 show the area of the beam impinging on each of those elements for the 0th diffraction order. It can be seen that the beam width in each case is smaller than the area of the element on which it impinges, which is to avoid edge diffraction effects.

It can also be seen from FIG. 5*b* that apart from the VCSEL 86 and the beam-separating arrangement 82, the remaining elements are positioned within a 120° sector 103 of a circle. The remaining two diffraction gratings and the corresponding beam-steering elements and sets of photo detectors (not shown in FIG. 5*b*) are similarly positioned in 120° sectors that are rotated with respect to the sector shown in FIG. 5*b* by 120° and 240° such that the three sectors together form a circle in plan view, where the circle contains all of the elements of the optical displacement sensor 70.

Figure 5C:
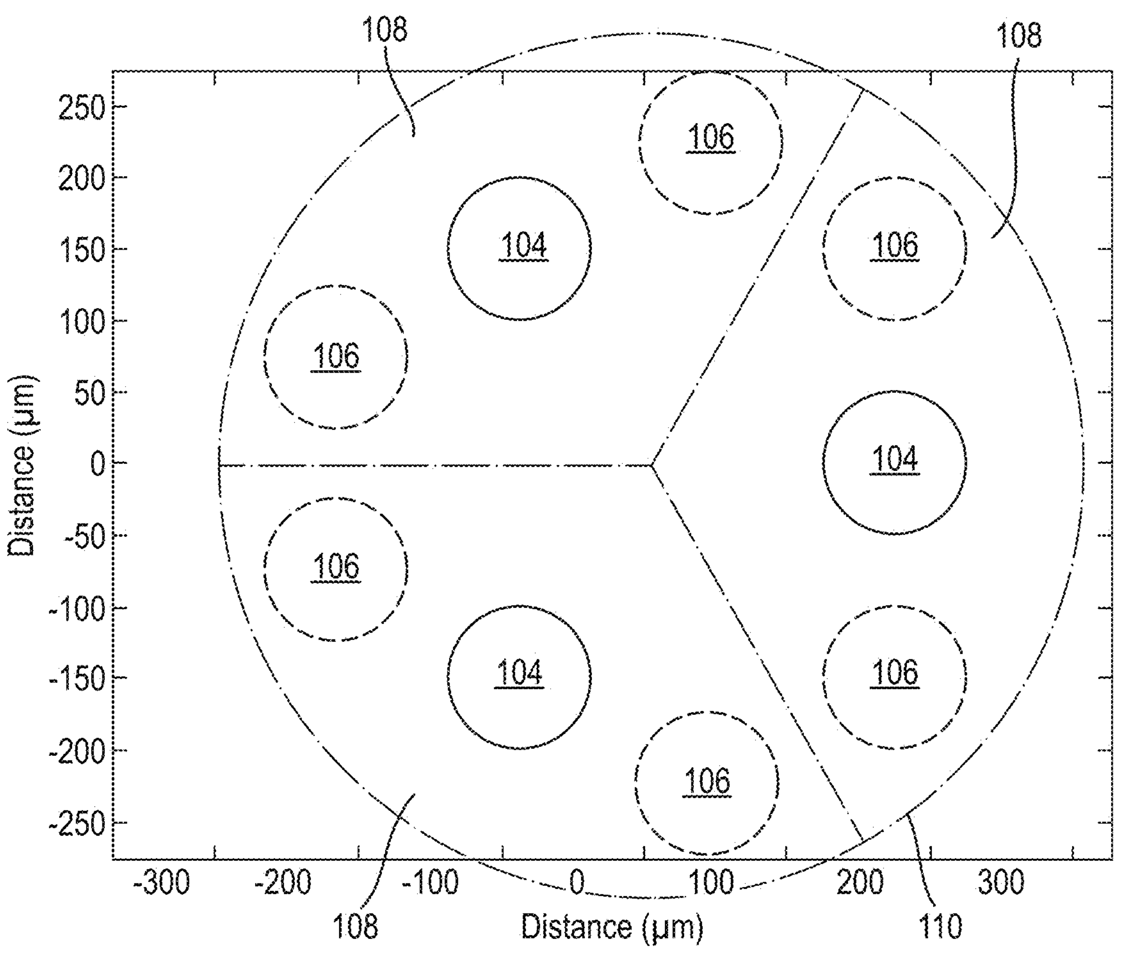
FIG. 5*c* shows a schematic plan view of an example photo detector layout for the optical displacement sensor of the embodiment shown in FIGS. 5*a* and 5*b;*

FIG. 5*c* shows a schematic plan view of an example photo detector layout for the optical displacement sensor 70 of the embodiment shown in FIGS. 5*a* and 5*b*. The layout has three-fold rotational symmetry, such that there are three sets of photo detectors 104, 106, each set being contained within one of three 120° sectors 108 in a circle 110, shown in dot-dash lines. The photo detectors 104 depicted in solid lines are positioned to receive the $0^{th}$ diffraction orders from each grating. The photo detectors 106 depicted in dotted lines are positioned to receive the $-1^{st}$ and $+1^{st}$ diffraction orders.

In the example of FIGS. 5*a* and 5*b*, the three gratings have relative height offsets to provide multiple working points for the membrane to increase the dynamic range of the microphone in a similar way to that described above with reference to FIG. 3.

In this example, although it is not essential, the separation between the membrane and the diffraction gratings is selected such that the optical path travelled by the first light portion for each diffraction grating is a half-integer multiple of the Talbot length (to within a suitable margin as discussed above), to provide the advantages discussed above relating to reducing light losses.

Figure 6:
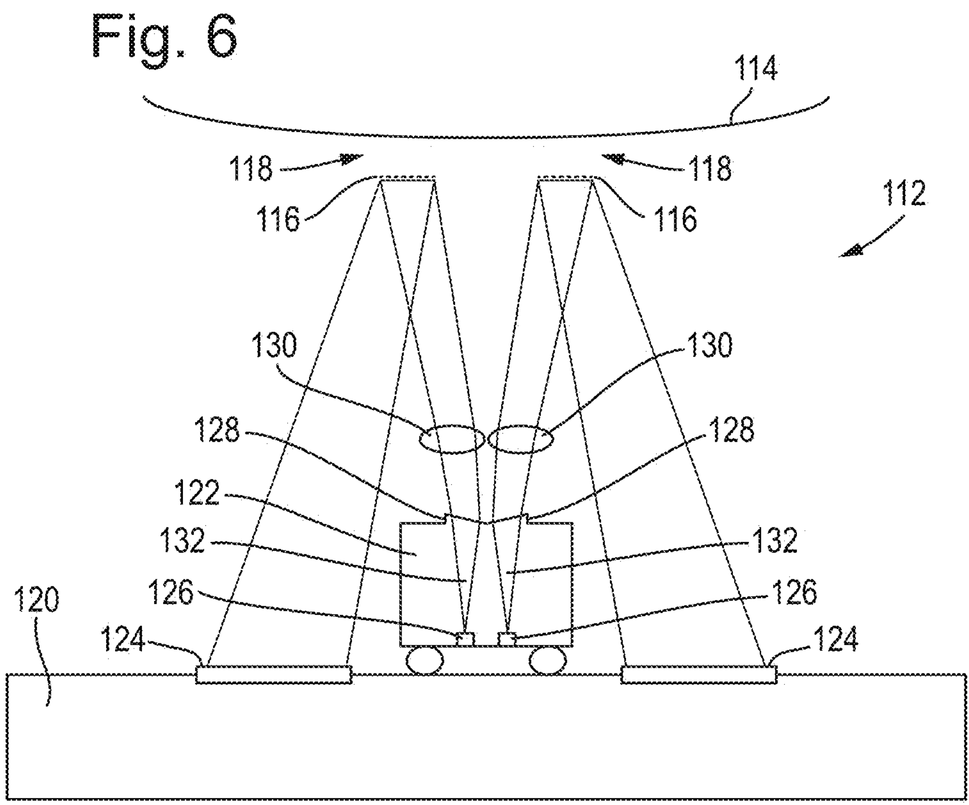
FIG. 6 shows a schematic front view of an optical displacement sensor in accordance with a fourth embodiment.

FIG. 6 shows a schematic front view of an optical displacement sensor 112 in accordance with a fourth embodiment. The fourth embodiment may be considered a variation on the embodiment of FIGS. 4*a-c*, although the same or similar variations may be provided in other embodiments, e.g. in the embodiments of FIGS. 5*a-c*.

The optical displacement sensor 112 comprises a membrane 114 and two diffraction gratings 116. The diffraction gratings 116, together with the membrane, each form a respective interferometric arrangement 118.

The membrane 112 and diffraction gratings 114 are supported above a substrate 120. (For clarity, the supporting structures supporting the membrane 114 and the diffraction gratings 116 are not shown in FIG. 6.) A VCSEL 122 and six photo detectors 124 (of which two are visible in FIG. 6) are provided on the substrate 120.

In this embodiment, the VCSEL 122 is a back-side emitting VCSEL comprising two emitters 126. Two prisms 128 are formed in the front (emitting) surface of the VCSEL 122. A collimating optical arrangement comprising lenses 130 is positioned between the VCSEL 122 and the diffraction gratings 116.

In operation, the emitters 126 each emit a respective beam of light 132. Each beam passes through one of the prisms 128. The prisms 128 direct the beams 132 onto a respective one of the lenses 130, which collimate the beams 132. The beams 132 then impinge on a respective one of the diffraction gratings 116.

Each of the beams 132 interacts with the respective grating 116 and the membrane 114 in the same way described above with reference to FIGS. 1, 4*a* and 5*a*, i.e. a first portion passes through the respective grating 116 to be reflected back by the membrane 114 to the grating 116, and is then transmitted and diffracted by the grating 116 into −1st, 0th and 1st diffraction orders that each impinge on a respective one of the detectors 124. A second portion is reflected and diffracted by the respective grating 116 into −1st, 0th and 1st diffraction orders, which each impinge on a respective one of the detectors 124, where it interferes with the corresponding first portion and the resultant signal is measured by the detector.

It can thus be seen that this embodiment varies from the embodiment of FIGS. 4*a-c* in that multiple light sources (i.e. the emitters 126) are used to provide separate beams, rather than a beam-separating optical arrangement being used to separate a single beam from a single light source. In addition, this particular example includes the prisms 124 on the VCSEL surface that provide a steering function, directing the beams 132 onto the lenses 130, although this is not an essential feature of this or any other embodiment.

Figure 7:
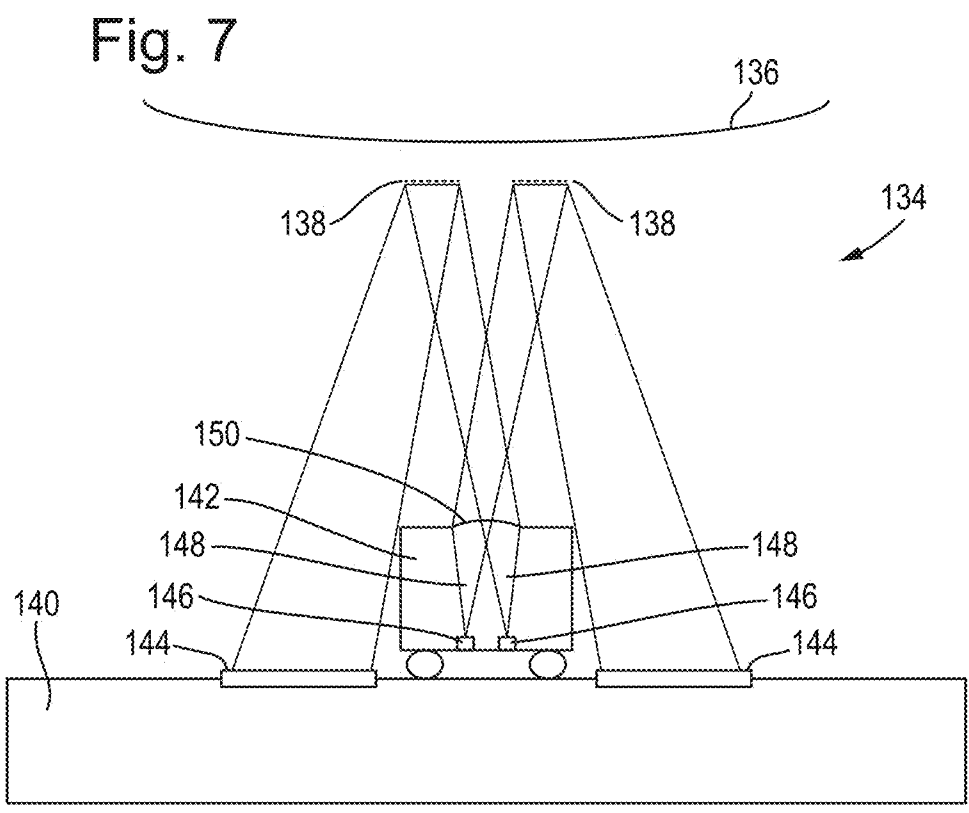
FIG. 7 shows a schematic front view of an optical displacement sensor in accordance with a fifth embodiment.

FIG. 7 shows a schematic front view of an optical displacement sensor 134 in accordance with a fifth embodiment. This embodiment is also a variation on the embodiment of FIGS. 4*a-c*. The optical displacement sensor 134 is in most respects the same as the optical displacement sensor 112 of FIG. 6, and operates in a similar way. However, it differs in the way that the light beams are directed onto the gratings.

The optical displacement sensor 134 comprises a membrane 136 and two diffraction gratings 138 positioned above a substrate 140, the substrate 140 having a VCSEL 142 and six photo detectors 144 mounted thereon. The VCSEL 142 is a back-side emitting VCSEL with two emitters 146 that each provide a light beam 148. However, instead of having prisms on the VCSEL surface with separately mounted lenses to direct and collimate the light beams 148, the VCSEL 142 has a lens 150 on its front (emitting) surface. The lens 150 both collimates and directs the light beams 148 so that they impinge on the gratings 138.

Figure 8:
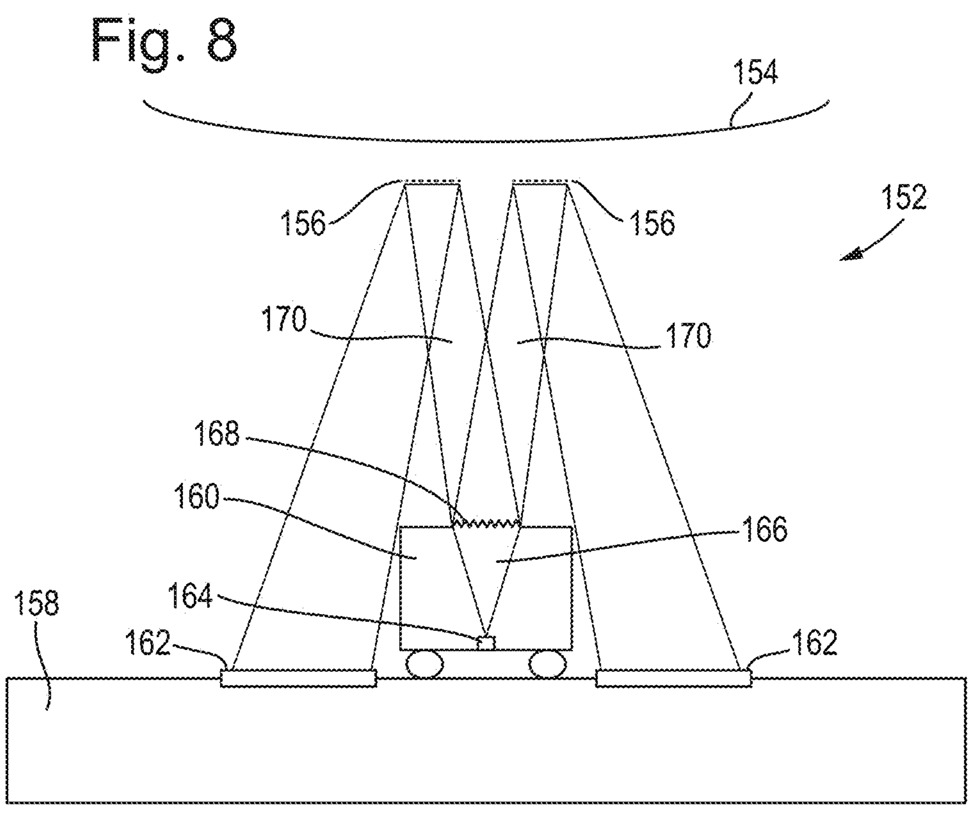
FIG. 8 shows a schematic front view of an optical displacement sensor in accordance with a sixth embodiment.

FIG. 8 shows a schematic front view of an optical displacement sensor 152 in accordance with a sixth embodiment. This embodiment is also a variation on the embodiment of FIGS. 4*a-c*. The optical displacement sensor 152 is in most respects the same as the optical displacement sensor 134 of FIG. 7, and operates in a similar way. However, it differs in the way that the light beams are directed onto the gratings.

The optical displacement sensor 152 comprises a membrane 154 and two diffraction gratings 156 positioned above a substrate 158, the substrate 158 having a VCSEL 160 and six photo detectors 162 mounted thereon. The VCSEL 160 is a back-side emitting VCSEL. However, in this embodiment, the VCSEL 160 has only one emitter 164 which provides a single light beam 166. Further, instead of a lens, there is a diffractive optical element 168 on the front (emitting) surface of the VCSEL 160.

The beam 168 from the VCSEL's emitter 164 impinges on the diffractive optical element 168, which separates and collimates the beam 166 to produce two separate, collimated beams 170 which then impinge on the diffraction gratings 156.

Figure 9:
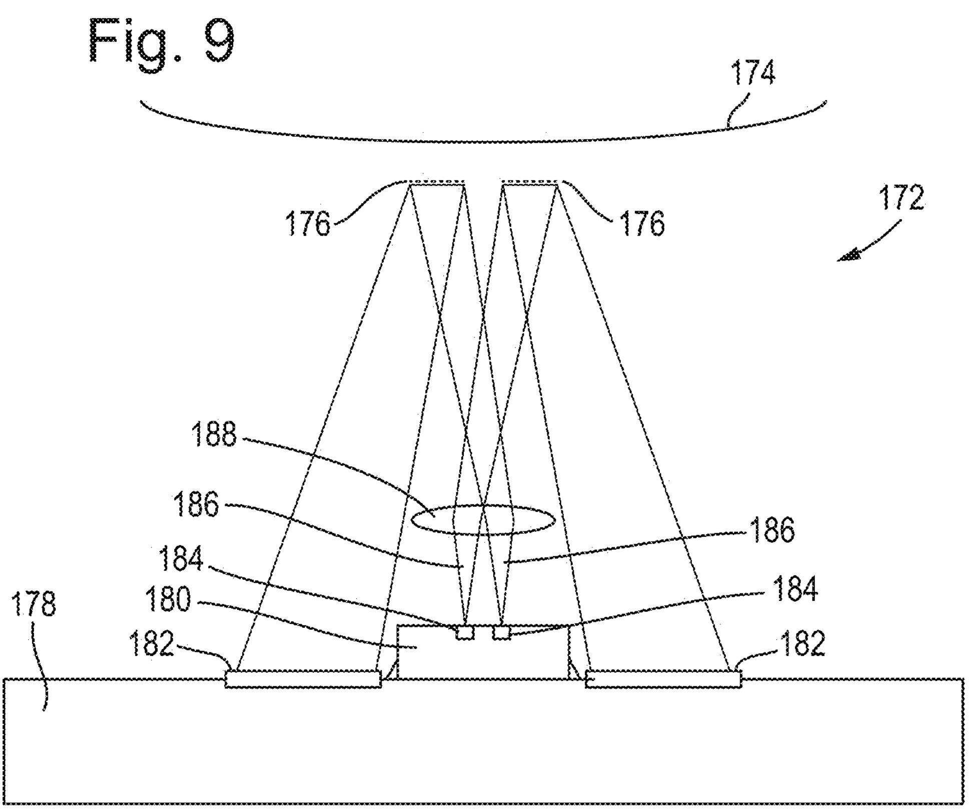
FIG. 9 shows a schematic front view of an optical displacement sensor in accordance with a seventh embodiment.

FIG. 9 shows a schematic front view of an optical displacement sensor 172 in accordance with a seventh embodiment. This embodiment is also a variation on the embodiment of FIGS. 4*a-c*. The optical displacement sensor 172 is in most respects the same as the optical displacement sensor 112 of FIG. 6, and operates in a similar way. However, it differs in the way that the light beams are directed onto the gratings.

The optical displacement sensor 172 comprises a membrane 174 and two diffraction gratings 176 positioned above a substrate 178, the substrate 178 having a VCSEL 180 and six photo detectors 182 mounted thereon. The VCSEL 180 has two emitters 184 which each provide a respective light beam 186, but in this embodiment, the VCSEL 180 is a front-side emitting VCSEL and it does not have any prisms, lenses or other optical elements formed in or on its front surface. Instead, a separate, single lens 188 is positioned between the VCSEL 180 and the gratings 176. In this example, the lens 188 is a refractive lens, but this is not essential, e.g. in other embodiments, the lens 188 may be a diffractive lens. The two light beams 186 are directed onto the lens 188, and each beam 186 passes through a different portion of the lens 188, which collimates the beams 186 and directs them onto a respective one of the gratings 176.

Where technically applicable, optional features and variations described in the context of specific embodiments having exactly two diffraction gratings may also apply to embodiments having three or more diffraction gratings, and vice versa.

It will be appreciated that the above-described embodiments are exemplary only, and that other embodiments and variations are possible within the scope of the invention, which is defined by the appended claims.

What is claimed is:

1. An optical displacement sensor comprising:

a reflective surface;

two or more diffraction gratings spaced from the reflective surface, wherein each diffraction grating together with the reflective surface defines a respective interferometric arrangement, and wherein either i) the reflective surface or ii) the diffraction gratings is/are moveable relative to the other;

a light source arranged to provide light to said interferometric arrangements such that, for each interferometric arrangement, a first portion of said light propagates along a first optical path via the interferometric arrangement and a second portion of said light propagates along a second different optical path via said interferometric arrangement, thereby giving rise to an optical path difference between the first and second optical paths which depends on a separation between the reflective surface and the diffraction grating of the interferometric arrangement; and for each interferometric arrangement, a respective set of one or more photo detector(s) arranged to detect at least part of an interference pattern generated by said first and second portions of light dependent on said optical path difference; and a collimating optical arrangement arranged to at least partially collimate the light between the light source and the diffraction grating(s);

wherein each diffraction grating comprises a set of parallel grating lines extending in a respective grating line direction, and wherein the grating line direction of each diffraction grating in a set of said diffraction gratings is different from the grating line direction of each other diffraction grating in said set.

2. The optical displacement sensor of claim 1, wherein the light source comprises a plurality of light source elements such that the light is provided as a plurality of beams of light, wherein each light source element provides a respective one of said beams, and wherein each beam of light is directed onto a respective one of the diffraction gratings.

3. The optical displacement sensor of claim 1, wherein between each diffraction grating and the reflective surface there is a perpendicular optical path length which is different for each diffraction grating.

4. The optical displacement sensor of claim 1, wherein the collimating optical arrangement comprises a lens.

5. The optical displacement sensor of claim 1, wherein a respective beam of the light impinges on each diffraction grating at a respective incidence angle to a normal to a plane in which the respective diffraction grating lies, wherein the incidence angle for each diffraction grating in a set of said diffraction gratings is different from the incidence angle of each other diffraction grating in said set.

6. The optical displacement sensor of claim 1, wherein each diffraction grating is oriented along a line of a set of lines extending radially from a centre point between the gratings.

7. The optical displacement sensor of claim 1, wherein the optical displacement sensor comprises N gratings, wherein the diffraction gratings are oriented at an angle of (360°)/N or a multiple thereof with respect to each other.

8. The optical displacement sensor of claim 1, wherein each interferometric arrangement comprises a pair of diffraction gratings having the same grating period and the same grating line direction, and being separated from the reflective surface by the same optical distance, such that the pair of diffraction gratings function together to direct light onto the same set of one or more photo detectors corresponding to said interferometric arrangement.

9. The optical displacement sensor of claim 1, wherein the diffraction gratings are arranged in a rotationally symmetric composite diffraction grating.

10. The optical displacement sensor of claim 1, wherein each set of one or more photo detectors comprises three photodetectors, and wherein said photo detectors are arranged such that a $+1^{st}$ diffraction order impinges on a first one of said photo detectors, a $0^{th}$ diffraction order impinges on a second one of said photo detectors and a $-1^{st}$ diffraction order impinges on a third one of said photo detectors.

11. The optical displacement sensor of claim 1, further comprising a membrane, wherein the reflective surface comprises or is provided on a surface of the membrane.

12. The optical displacement sensor of claim 1 wherein, for each interferometric arrangement, when the reflective surface or the diffraction grating is in a zero-displacement position, the diffraction grating is spaced from the reflective surface by a distance such that the respective first portion of light travels along an optical path length L between the diffraction grating and the reflective surface; and wherein each diffraction grating comprises a periodic diffraction grating with a grating period p such that for each interferometric arrangement, the grating period p and the optical path length L satisfy:

A) the relationship:

$$L = \frac{T_z n}{2},$$

to within 20% of $$\frac{T_z}{2},$$

where n is an integer; or

B) the relationship:

$$L = \frac{T_z m}{4},$$

to within 20% of $$\frac{T_z}{4},$$

where m is an odd integer;

where $T_z$ is the Talbot length, defined by:

$$T_z = \frac{\lambda}{1 - \sqrt{1 - \frac{\lambda^2}{p^2}}},$$

where $\lambda$ is the wavelength of the light.

13. The optical displacement sensor of claim 1, wherein in a zero-displacement position the reflective surface is separated from each of the diffraction gratings by a perpendicular distance of at least 15 μm.

14. An optical microphone comprising the optical displacement sensor of claim 1.

15. The optical displacement sensor of claim 1, wherein the optical displacement sensor comprises a beam-separating optical arrangement arranged to separate the light into two or more beams, wherein each of the two or more beams is directed onto a respective one of the diffraction gratings.

16. The optical displacement sensor of claim 15, wherein the collimating optical arrangement and the beam-separating optical arrangement are formed as a single component that performs both the function of at least partially collimating the light and the function of separating the light into two or more beams.

17. The optical displacement sensor of claim 1, wherein a respective beam of the light impinges on each diffraction grating at an angle to a normal to a plane in which the respective diffraction grating lies.

18. The optical displacement sensor of claim 17, wherein a direction of propagation of each beam is in a plane that is i) parallel to the grating line direction of the diffraction grating on which said beam impinges and ii) perpendicular to a plane in which said diffraction grating lies.

19. The optical displacement sensor of claim 1, further comprising a beam-steering optical arrangement arranged to direct the first and second light portions for each interferometric arrangement onto the respective photo detector(s) provided for said interferometric arrangement.

20. The optical displacement sensor of claim 19, wherein a beam-separating optical arrangement and the beam-steering optical arrangement are provided on a common substrate.

* * * * *